(12) United States Patent
Khan et al.

US011001757B2

(10) Patent No.: US 11,001,757 B2
(45) Date of Patent: *May 11, 2021

(54) HETEROCYCLIC LIQUID CRYSTAL COMPOSITION, REVERSE-MODE POLYMER DISPERSED LIQUID CRYSTAL ELEMENT, AND SELECTIVELY DIMMABLE DEVICE

(71) Applicant: NITTO DENKO CORPORATION, Osaka (JP)

(72) Inventors: Sazzadur Rahman Khan, Oceanside, CA (US); Hiep Luu, San Marcos, CA (US)

(73) Assignee: NITTO DENKO CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/636,603

(22) PCT Filed: Aug. 3, 2018

(86) PCT No.: PCT/US2018/045281
§ 371 (c)(1),
(2) Date: Feb. 4, 2020

(87) PCT Pub. No.: WO2019/028439
PCT Pub. Date: Feb. 7, 2019

(65) Prior Publication Data
US 2020/0369957 A1    Nov. 26, 2020

Related U.S. Application Data

(60) Provisional application No. 62/541,448, filed on Aug. 4, 2017.

(51) Int. Cl.
*G02F 1/1333* (2006.01)
*C09K 19/34* (2006.01)
*C09K 19/12* (2006.01)
*C09K 19/20* (2006.01)

(52) U.S. Cl.
CPC .......... *C09K 19/3477* (2013.01); *C09K 19/12* (2013.01); *C09K 19/2007* (2013.01); *C09K 2019/122* (2013.01); *C09K 2019/123* (2013.01); *C09K 2019/2035* (2013.01); *C09K 2323/03* (2020.08)

(58) Field of Classification Search
CPC ............... C09K 19/3477; C09K 19/12; C09K 19/2007; C09K 2019/122; C09K 2019/123; C09K 2019/2035; C09K 2323/03; G02F 1/1333
USPC .................................................. 252/299.62
See application file for complete search history.

(56) References Cited

U.S. PATENT DOCUMENTS

| | | |
|---|---|---|
| 6,623,810 B2 | 9/2003 | Sekine et al. |
| 8,323,805 B2 | 12/2012 | Zheng et al. |
| 8,405,799 B2 | 3/2013 | Fujisawa et al. |
| 8,420,235 B2 | 4/2013 | Zheng |
| 8,747,695 B2 | 6/2014 | Jasper et al. |
| 8,999,198 B2 | 4/2015 | Reiffenrath et al. |
| 9,169,438 B2 | 10/2015 | Reiffenrath et al. |
| 9,296,948 B2 | 3/2016 | Manabe et al. |
| 2002/0001734 A1 | 1/2002 | Yoshikawa et al. |
| 2003/0003246 A1 | 1/2003 | Negoro et al. |
| 2004/0115367 A1 | 6/2004 | Iftime et al. |
| 2008/0063808 A1 | 3/2008 | Stumpe et al. |
| 2009/0290214 A1 | 11/2009 | Cho et al. |
| 2010/0181533 A1 | 7/2010 | Jansen et al. |
| 2012/0287354 A1 | 11/2012 | Heckmeier et al. |
| 2013/0128339 A1 | 5/2013 | Gu et al. |
| 2013/0207038 A1 | 8/2013 | Haensel et al. |
| 2014/0008575 A1 | 1/2014 | Jasper et al. |
| 2014/0239227 A1 | 8/2014 | Manabe et al. |
| 2014/0346399 A1 | 11/2014 | Fujita et al. |
| 2015/0299577 A1 | 10/2015 | Junge et al. |
| 2019/0187497 A1* | 6/2019 | Khan ..................... G02F 1/137 |

FOREIGN PATENT DOCUMENTS

| | | |
|---|---|---|
| CN | 1974616 A | 6/2007 |
| CN | 104087307 B | 4/2016 |
| EP | 0442266 A1 | 8/1991 |
| JP | 07-292363 A | 11/1995 |
| WO | 2015022980 A1 | 2/2015 |
| WO | 2018031410 A2 | 2/2018 |

OTHER PUBLICATIONS

Bao, W. et al., Carbazole nematic liquid crystals, Liquid Crystals, 37(10), 2010, 1289-1303.
Kosaka, Y. et al., Thermotropic liquid crystalline ionic stilbazoles and their miscible mixtures with non-ionic carbazolyl compounds, Liquid Crystals, 1995, 18(5), 693-698.
International Search Report and Written Opinion, PCT/US2018/045281, dated Nov. 26, 2018.
Rudolph, S.E. et al., Technologies for Smart Windows, ASHRAE Journal, 2009, 51(7), 104-107.
Cupelli, D. et al., Reverse Mode Operation Polymer Dispersed Liquid Crystal with a Positive Dielectric Anisotropy Liquid Crystal, Journal of Polymer Science: Part B: Polymer Physics, 2011, 49(4), 257-262.
Sbar, N.L. et al., Electrochromic dynamic windows for office buildings, International Journal of Sustainable Built Environment, 2012, 1(1), 125-139.

(Continued)

*Primary Examiner* — Geraldina Visconti
(74) *Attorney, Agent, or Firm* — Maschoff Brennan; Brent A. Johnson; David W. Old

(57) ABSTRACT

Described herein are heterocyclic liquid crystal compositions that can allow for the adjustment of their refractive indices by the application of an electric field. In addition, selectively dimmable reverse-mode polymer dispersed liquid crystal (PDLC) elements and devices using these compositions are also described, which are transparent when no voltage is applied and opaque when a voltage is applied.

23 Claims, 3 Drawing Sheets

(56) References Cited

OTHER PUBLICATIONS

Di Profio, G. et al., Reverse-Mode Operation Switchable Nematic Emulsions, Langmuir, 2002, 18(8), 3034-3038.
Yamaguchi, R. et al., Electro-optical Properties and Morphology of Reverse Scatterning Mode TN LCD, Journal of Photopolymer Science and Technology, 2012, 25(3), 313-316.
Chen, T.-J. et al., Electro-optical Properties of Reverse-Mode Films of Planar Aligned Polymer-Dispersed Liquid Crystal, Journal of Polymer Research, 2006, 13(2), 85-89.
Macchione, M. et al., Photochromic Reverse mode polymer dispersed liquid crystals, Liquid Crystals, 2005, 32(3), 315-318.
Yoon, H. et al., Homogeneous and homeotropic alignment of bent-core uniaxial and biaxial nematic liquid crystals, Soft Matter, 7(19), 8770-5, 2011.
Malthete, J. et al., Recherches sur les Substances Mésomorphes III. Tolanes Nématiques, Molecular Crystals and Liquid Crystals, 23(3-4), 233-60, Jan. 1973.
Hird, M. Fluorinated liquid crystals—properties and applications. Chemical Society Reviews, 36(12), 2070-2095, 2007.
Mouquinho, A.I. et al., New Polymer Networks for PDLC Films Application. In New Polymers for Special Applications, 2012. InTech.
Jeong, S.Y., Liquid crystalline behavior of mesogens formed by anomalous hydrogen bonding (Doctoral dissertation, Kent State University), Aug. 2011.
Tanner, J.R., Novel alignment materials for use in liquid crystal displays (Doctoral dissertation, University of North Carolina at Chapel Hill), 2006.
Nolan, P. et al., Reverse mode polymer dispersed liquid crystal display incorporating a dual frequency addressable liquid crystal mixture, Molecular Crystals and Liquid Crystals Letters, 1991, 8(4), 75-83.
Gotoh, T. et al., Preparation and Optical Properties of a Reverse-Mode Polymer Dispersed Liquid Crystal Film, MRSOnline Proceedings Library Archive, 1992, 277.
Ahmad, F. et al., Current Trends in Studies on Reverse-Mode Polymer Dispersed Liquid-Crystal Films—A Review, Electronic Materials Letters, 10(4), 679-692, Jul. 2014.
Li, N. et al., Synthesis of 1,4-Bis(phenylethynyl)benzenes and Their Application as Blue Phase Liquid Crystal Composition, International Journal of Molecular Sciences, 14(12), 23257-23273, Nov. 2013.
Abidin, I.S.B.Z., Study on High-Performance PDLC Optical Devices (Master Thesis, Gunma University), 2013.

* cited by examiner

Positive Dielectric Anisotropy  Negative Dielectric Anisotropy

Positive Dielectric Anisotropy

Negative Dielectric Anisotropy

HETEROCYCLIC LIQUID CRYSTAL COMPOSITION, REVERSE-MODE POLYMER DISPERSED LIQUID CRYSTAL ELEMENT, AND SELECTIVELY DIMMABLE DEVICE

CROSS REFERENCE TO RELATED APPLICATION

This application is a national phase application of PCT/US2018/045281, filed on Aug. 3, 2018, which claims the benefit of U.S. Provisional Application No. 62/541,448, filed Aug. 4, 2017, which is incorporated by reference in its entirety.

FIELD

The present embodiments relate to compounds or compositions having both liquid and crystalline properties, and the elements or devices using these compounds or compositions.

BACKGROUND

Smart windows are attractive alternatives to conventional mechanical shutters, blinds, or hydraulic methods of shading. Currently, there are three main technologies for smart window applications: suspended particle displays (SPD), Polymer Dispersed Liquid Crystals (PDLCs), and metal oxide electrochromics (ECs).

One drawback of conventional PDLCs or conventional mode devices is that the window becomes transparent only when a voltage is applied, and it becomes opaque when the power is off. Opaque windows are not desirable in applications where visibility through the window would enhance safety when there is loss of power in an emergency situation such as in vehicle or aircraft crash or in a building fire. For electrochromic windows, the application of a voltage is usually needed to trigger a change in the window characteristics, even though it may not be required to maintain dimming. Advances have been made to create reverse mode devices such as Reverse Mode PDLCs, or PDLCs that are transparent when a voltage is not applied.

One way of creating reverse mode PDLCs is using liquid crystal nematic compounds, either negative dielectric anisotropy or positive dielectric anisotropy, and aligning them in such a way that they are transparent when the power is off.

To meet the market demands for low driving voltage, there is an increased need for new improved liquid crystal materials having high magnitudes of dielectric anisotropy to enable enhanced operation of reverse mode smart windows with low driving voltages.

SUMMARY

The current disclosure describes a new liquid crystal (LC) composition, a polymer dispersed liquid crystal (PDLC) element comprising the liquid crystal composition, a selectively dimmable device comprising the PDLC element, and methods of manufacturing the device. These new materials can be used in reverse mode PDLC dimmable devices. The materials can be integral to a window or applied as a coating to provide a dimming capability for privacy purposes among others.

Some embodiments include a liquid crystal composition comprising a compound of Formula I:

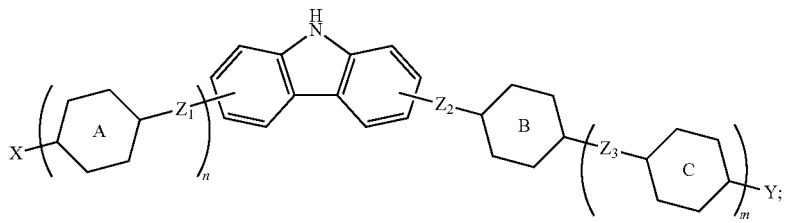

wherein carbazol-diyl (with structure shown below) is optionally substituted with one or more of: $C_{1-6}$ alkyl, $C_{1-6}$ alkyloxy, —F, —$CF_3$, or —$OCF_3$; Rings A, B, and C are independently optionally substituted 1,4-phenylene or a 1,4-cyclohexane-diyl, wherein the 1,4-phenylene is optionally substituted with one or more of: $C_{1-6}$ alkyl, $C_{1-6}$ alkyloxy, —F, —$CF_3$, or —$OCF_3$; $Z_1$, $Z_2$, and $Z_3$ are independently a bond, —$CH_2CH_2$—, —$CH_2O$—, —C(O)O—, —CH=CH—, —C≡C—, —$CH_2CHF$—, —$CH_2CF_2$—, —CHFCHF—, —$CF_2CHF$—, —$CF_2CF_2$—, —CHFO—, or —$CF_2O$—; X is $C_{2-12}$ alkyl, $C_{2-12}$ alkyloxy, or —S—$C_{2-12}$ alkyl; Y is —F, —CN, —$CF_3$, —$OCF_3$, —$OCF_2$, —NCS, $C_{1-10}$ alkyl, or $C_{1-10}$ alkyloxy; n is 0 or 1; and m is 0 or 1.

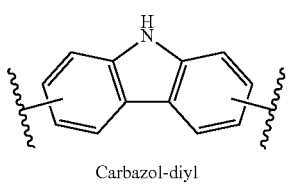

Carbazol-diyl

Some embodiments include the liquid crystal composition comprising a liquid crystal compound of Formula I, and at least one additional liquid crystal compound of Formula II:

Formula II

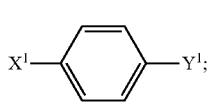

wherein $X^1$ is substituted phenyl, substituted biphenyl, substituted benzoyloxy, or substituted phenoxycarbonyl;

and $Y^1$ is $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, —$SO_2R^a$; —$C(O)R^a$, —$C(O)OR^a$, or —$C(O)NR^aR^b$, and $R^a$ and $R^b$ are independently H or optionally substituted —$C_{1-6}$ hydrocarbyl.

Some embodiments include a liquid crystal element comprising a transparency changing layer and at least two alignment layers bounded on each side of the transparency changing layer, wherein the transparency changing layer comprises any one of the liquid crystal compositions described herein.

Some embodiments include a selectively dimmable device comprising the liquid crystal element described above, at least two conductive substrates: a first conductive substrate and a second conductive substrate, and a voltage source. The first and second conductive substrates define a gap between them, and the liquid crystal element is disposed between the first and second conductive substrates within the gap. The substrates and the liquid crystal element are in electrical communication with the voltage source such that when a voltage is applied from the voltage source, an electric field is generated across the liquid crystal element. Some embodiments include the characterization of the selectively dimmable devices. These devices can have a haze of at most 5% when no voltage is applied, and a haze of at least 40% when a voltage of at least 25 volts is applied across the device, which may have various broad applications. Some embodiments include substrates that are flexible so that the device can form a flexible sheet providing versatility in industrial applications.

DETAILED DESCRIPTION

I. General

Figures 1A, 1B:
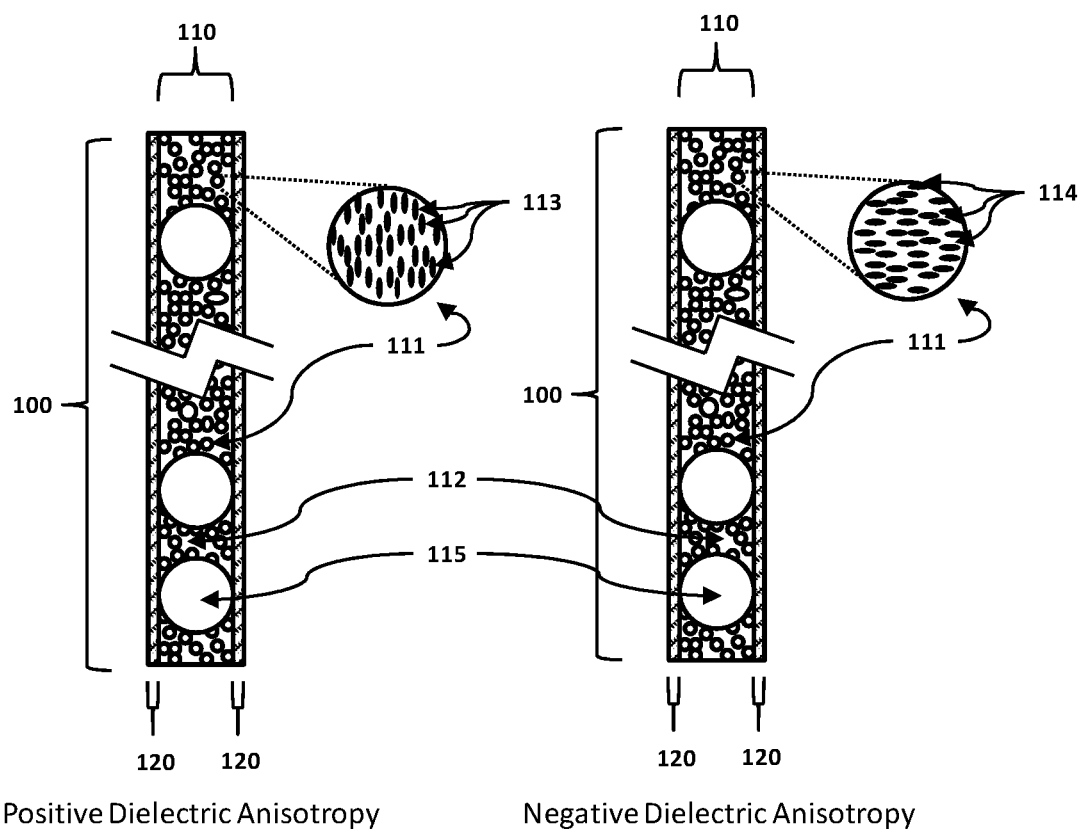
FIG. 1A is a depiction of a liquid crystal element comprising a liquid crystal with positive dielectric anisotropy.
FIG. 1B is a depiction of a liquid crystal element comprising a liquid crystal with negative dielectric anisotropy.

Unless otherwise indicated, when a compound or chemical structural feature, such as alkyl, alkenyl, alkynyl, aryl, heteroaryl, etc., is referred to as being "optionally substituted," it includes a feature that has no substituents (i.e. unsubstituted), or a feature that is "substituted," meaning that the feature has one or more substituents. The term "substituent" has the broadest meaning known to one of ordinary skill in the art, and includes a moiety that occupies a position normally occupied by one or more hydrogen atoms attached to a parent compound or structural feature. In some embodiments, a substituent may be an ordinary organic moiety known in the art, which may have a molecular weight (e.g. the sum of the atomic masses of the atoms of the substituent) of 15-50 g/mol, 15-100 g/mol, 15-150 g/mol, 15-200 g/mol, 15-300 g/mol, or 15-500 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, S, Si, F, Cl, Br, or I; provided that the substituent includes one C, N, O, S, Si, F, Cl, Br, or I atom. Examples of substituents include, but are not limited to, alkyl, alkenyl, alkynyl, heteroalkyl, heteroalkenyl, heteroalkynyl, aryl, heteroaryl, hydroxy, alkoxy, aryloxy, acyl, acyloxy, alkylcarboxylate, thiol, alkylthio, cyano, halo, thiocarbonyl, O-carbamyl, N-carbamyl, O-thiocarbamyl, N-thiocarbamyl, C-amido, N-amido, S-sulfonamido, N-sulfonamido, isocyanato, thiocyanato, isothiocyanato, nitro, silyl, sulfenyl, sulfinyl, sulfonyl, haloalkyl, haloalkoxyl, trihalomethanesulfonyl, trihalomethanesulfonamido, amino, etc.

The term "alkyl" as used herein refers to a moiety comprising carbon and hydrogen containing no double or triple bonds. An alkyl may be linear, branched, cyclic, or a combination thereof, and contain from one to thirty-five carbon atoms. Examples of alkyl groups include but are not limited to methyl, ethyl, propyl, isopropyl, cyclopropyl, n-butyl, iso-butyl, tert-butyl, cyclobutyl, pentyl isomers, cyclopentane, hexyl isomer, cyclohexane, and the like. The term "linear alkyl" as used herein refers to —$(CH_2)_qCH_3$, where q varies between 0 to 30. The term "$C_{1-6}$ alkyl" as used herein refers to alkyl having from 1 to 6 carbon atoms such as but not limited to methyl, ethyl, propyl isomers, butyl isomers, cyclobutyl isomers, pentyl isomers, cyclopentyl isomers, hexyl isomers, cyclohexyl isomers, heptyl isomers, cycloheptyl isomers, octyl isomers, cyclooctyl isomers, nonyl isomers, cyclononyl isomers, decyl isomers, cyclodecyl isomers, undecyl isomers, cycloundecyl isomers, dodecyl isomers, cyclododecyl isomers, tridecyl isomers, cyclotridecyl isomers, tetradecyl isomers, cyclotetradecyl isomers, pentadecyl isomers, cyclopentadecyl isomers, hexadecyl isomers, cyclohexadecyl isomers, heptadecyl isomers, cycloheptadecyl isomers, octadecyl isomers, cyclooctadecyl isomers, nonadecyl isomers, cyclononadecyl isomers, eicosyl isomers, cycloeicosyl isomers. The term "alkylene" is a subgenus of "alkyl" and refers to a divalent alkyl moiety, e.g. —$CH_2$—, etc.

The term "alkyloxy" as used herein refers to a moiety comprising an alkyl that is singularly bonded to an oxygen, the oxygen becoming the point of attachment for the moiety (i.e. —O—R). An alkyloxy may be linear, branched, cyclic, or a combination thereof, and contain from one to thirty-five carbon atoms. When an alkyloxy is branched the alkyl group comprising the alkyloxy is a branched alkyl.

The terms "positive dielectric anisotropy", "negative dielectric anisotropy", and "neutral dielectric anisotropy" as used herein all have the broadest meanings generally understood in the art by those of ordinary skill in the art. The dielectric anisotropy is related to dielectric properties as well as optical properties depending on the direction, either along the length of the molecule (or molecular axis), or perpendicular to the length of the molecule (or molecular axis). The dielectric properties depend on the molecular shape and substituent moieties and their locations on a given molecule. A molecule is said to have a positive dielectric anisotropy if the dielectric constant parallel to the length of the molecule is greater than the dielectric constant perpendicular to the length of the molecule, where the length of a molecule is defined as vector between the two farthest moieties. A molecule is said to have a negative dielectric anisotropy if the dielectric constant perpendicular to the length molecule is greater than the dielectric constant parallel to the length of the molecule, where the length of a molecule is defined as vector between the two farthest moieties. A molecule is said to have a neutral dielectric anisotropy if the dielectric constant perpendicular to the length molecule is approximately the same as the dielectric constant parallel to the length of the molecule, where the length of a molecule is defined as vector between the two farthest moieties. Approximately the same is less than a 1% difference between dielectric constants.

The terms "nematic phase", "smectic phase", and "isotropic phase" as used herein all have the broadest meanings generally understood in the art by those of ordinary skill in the art when referring to liquid crystal phases.

The term "opposing surfaces" as used herein refers to two surfaces or sides of a shape or polygon that are on the opposite side of the shape or polygon with respect to each other (e.g. the top and bottom of a layer, the front and back or a shape). When used in singular, the term "opposing surface" refers to one of the two surfaces.

The current disclosure as described in detail below relates to a liquid crystal composition, a polymer dispersed liquid crystal (PDLC) element, and a selectively dimmable device based on the element, and methods of manufacturing these devices.

II. Liquid Crystal Composition

In some embodiments, a compound is described as having both liquid and crystalline characteristics, e.g. a liquid crystal compound. A liquid crystal composition can comprise one or more liquid crystal compounds. A liquid crystal composition can exhibit a mesogenic liquid crystal phase. In some embodiments, the liquid crystal composition can comprise a liquid crystal compound with positive dielectric anisotropy, where the liquid crystal aligns parallel to the electric field. Upon application of an electric field, the positive charge is displaced to one end of the molecule and the negative charge to the other end, thus creating an induced dipole moment. This results in the alignment of the longitudinal axis of liquid crystal molecules mutually parallel to the electric field direction. In some embodiments, the liquid crystal composition can comprise a liquid crystal compound with negative dielectric anisotropy, where the liquid crystal aligns perpendicular to the electric field. The index of refraction is larger along with the long axis of the molecules, than the perpendicular to it. The optical and dielectric anisotropies of liquid crystals enable the index of refraction to be controlled electrically. In some embodiments, the liquid crystal composition can comprise both liquid crystal compounds with positive dielectric anisotropy and liquid crystal compounds with negative dielectric anisotropy. In some embodiments, the liquid crystal composition can comprise a compound with negative dielectric anisotropy. In some embodiments, the liquid crystal composition can comprise both a compound with positive dielectric anisotropy and a compound with negative dielectric anisotropy.

In some embodiments, the liquid crystal composition can comprise a heterocyclic compound represented by Formula I.

Some embodiments include a liquid crystal composition comprising a heterocyclic compound represented by Formula III or IV:

Formula III

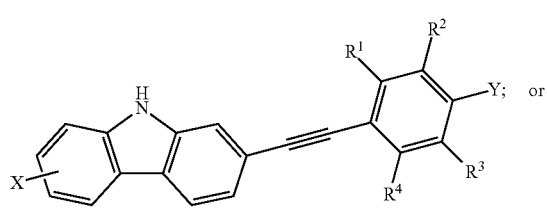

or

Formula IV

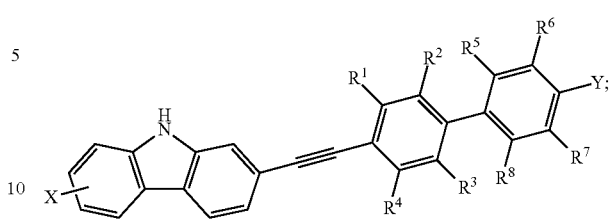

wherein carbazol-diyl is optionally substituted with one or more of: $C_{1-6}$ alkyl, $C_{1-6}$ alkyloxy, —F, —CF$_3$, or —OCF$_3$; $R^1$, $R^2$, $R^3$, $R^4$, $R^5$, $R^6$, $R^7$, and $R^8$ are independently H, $C_{1-6}$ alkyl, $C_{1-6}$ alkyloxy, —F, —CF$_3$, or —OCF$_3$; X is $C_{2-12}$ alkyl, $C_{2-12}$ alkyloxy, or —S—$C_{2-12}$ alkyl; and Y is —Br, —Cl, —F, —I, —CN, —CF$_3$, —NCS, —OCF$_3$, $C_{2-10}$ alkyl, or $C_{2-10}$ alkyloxy.

With respect to any relevant structural representation, such as Formula I, III or IV, carbazolyl is optionally substituted with $C_{1-6}$ alkyl, $C_{1-6}$ alkyloxy, —F, —CF$_3$, or —OCF$_3$. In some embodiments, carbazolyl is substituted with one or more of the substituents listed above. In some embodiments, carbazolyl is an unsubstituted carbazolyl.

With respect to any relevant structural representation, such as Formula I, III or IV, X is optionally substituted $C_{1-30}$ alkyl, $C_{1-30}$ alkyloxy, or —S—$C_{1-30}$ alkyl. In some embodiments, X is $C_{2-12}$ alkyl, $C_{2-12}$ alkyloxy, or —S—$C_{2-12}$ alkyl. In some embodiments, X is $C_{2-12}$ alkyl or $C_{2-12}$ alkyloxy. In some embodiments, X is $C_{2-12}$ alkyl. In some embodiments, X is $C_{2-12}$ alkyloxy. In some embodiments, X is $C_{3-8}$ alkyl. In some embodiments, X is $C_{3-8}$ alkyloxy. In some embodiments, X is:

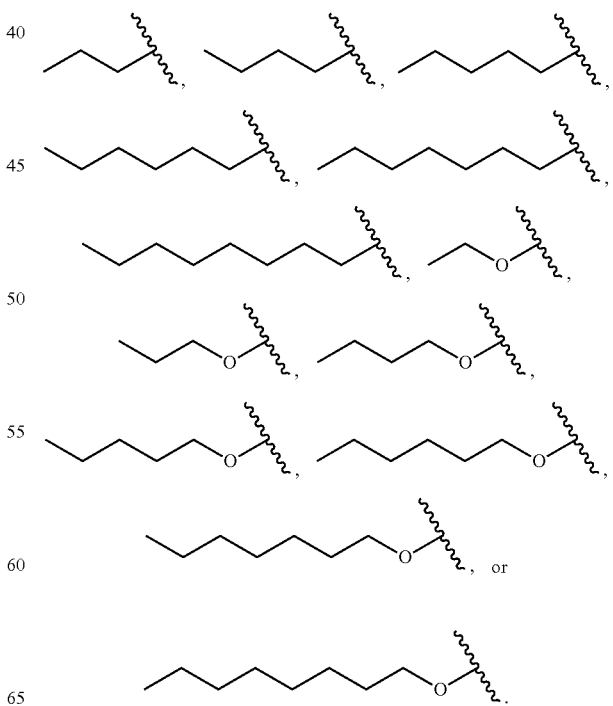

In some embodiments, X is:

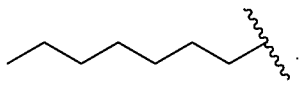 [SMILES: *CCCCCCC]

In some embodiments, X is:

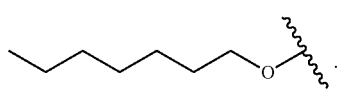 [SMILES: *OCCCCCCC]

With respect to any relevant structural representation, such as Formula I, III or IV, Y is —Br, —Cl, —F, —I, —CN, —CF$_3$, —NCS, —OCF$_3$, —OCF$_2$, —C$_{1-10}$ alkyl, or —C$_{1-10}$ alkyloxy, or a combination thereof. In some embodiments, Y is —F, —CN, —CF$_3$, —OCF$_3$, —OCF$_2$, —NCS, —C$_{1-10}$ alkyl, or —C$_{1-10}$ alkyloxy. In some embodiments, Y is —Br, —Cl, —F, —I, —CN, —CF$_3$, —NCS, —OCF$_3$, —C$_{2-10}$ alkyl, or —C$_{2-10}$ alkyloxy. In some embodiments, Y is —C$_{2-10}$ alkyl or —C$_{2-10}$ alkyloxy. In some embodiments, Y is —C$_{3-8}$ alkyl or C$_{3-8}$ alkyloxy. In some embodiments, Y is —F, —Br, —CN, or —NCS. In some embodiments, Y is —CN. In some embodiments, Y is F.

With respect to Formula I, in some embodiments, Ring A, B and C are independently optionally substituted 1,4-phenyl or 1,4-cyclohexyl. In some embodiments, Rings A, B and C are independently optionally substituted 1,4-phenyl. In some embodiments, 1,4-phenyl is optionally substituted with —C$_{1-6}$ alkyl, —C$_{1-6}$ alkyloxy, —F, —CF$_3$, or —OCF$_3$, or a combination thereof. In some embodiments, 1,4-phenyl is substituted with at least one of the substituents selected from —C$_{1-6}$ alkyl, —C$_{1-6}$ alkyloxy, —F, —CF$_3$, and —OCF$_3$. In some embodiments, 1,4-phenyl is substituted with —F. In some embodiments, multiple substituents are present on 1,4-phenyl, such as two —F groups.

With respect to Formula I, in some embodiments, Z$_1$, Z$_2$, and Z$_3$ are independently a bond, —CH$_2$CH$_2$—, —CH$_2$O—, —C(O)O—, —CH═CH—, —C≡C—, —CH$_2$CHF—, —CH$_2$CF$_2$—, —CHFCHF—, —CF$_2$CHF—, —CF$_2$CF$_2$—, —CHFO—, or —CF$_2$O—. In some embodiments, Z$_1$, Z$_2$, and Z$_3$ are independently a bond or —C≡C—. In some embodiments, Z$_1$, Z$_2$, and Z$_3$ are independently a bond. In some embodiments, Z$_1$, Z$_2$, and Z$_3$ are independently —C≡C—.

With respect to Formula I, in some embodiments, n is 0 or 1. In some embodiments, n is 0. In some embodiments, n is 1.

With respect to Formula I, in some embodiments, m is 0 or 1. In some embodiments, m is 0. In some embodiments, m is 1.

With respect to any relevant structural representation, such as Formula III or IV, in some embodiments, R$^1$, R$^2$, R$^3$, R$^4$, R$^5$, R$^6$, R$^7$, and R$^8$ are independently H, —C$_{1-6}$ alkyl, —C$_{1-6}$ alkyloxy, —F, —CF$_3$, or —OCF$_3$. In some embodiments, R$^1$, R$^2$, R$^3$, R$^4$, R$^5$, R$^6$, R$^7$, and R$^8$ are independently H, —F, or —OCF$_3$. In some embodiments, R$^1$, R$^2$, R$^3$, R$^4$, R$^5$, R$^6$, R$^7$, and R$^8$ are independently H or F. In some embodiments, R$^1$, R$^2$, R$^3$, R$^4$, R$^5$, R$^6$, R$^7$, and R$^8$ are independently H. In some embodiments, R$^1$, R$^2$, R$^3$, R$^4$, R$^5$, R$^6$, R$^7$, and R$^8$ are independently F.

In some embodiments, the liquid crystal composition can comprise a compound represented by or an optionally substituted compound thereof:

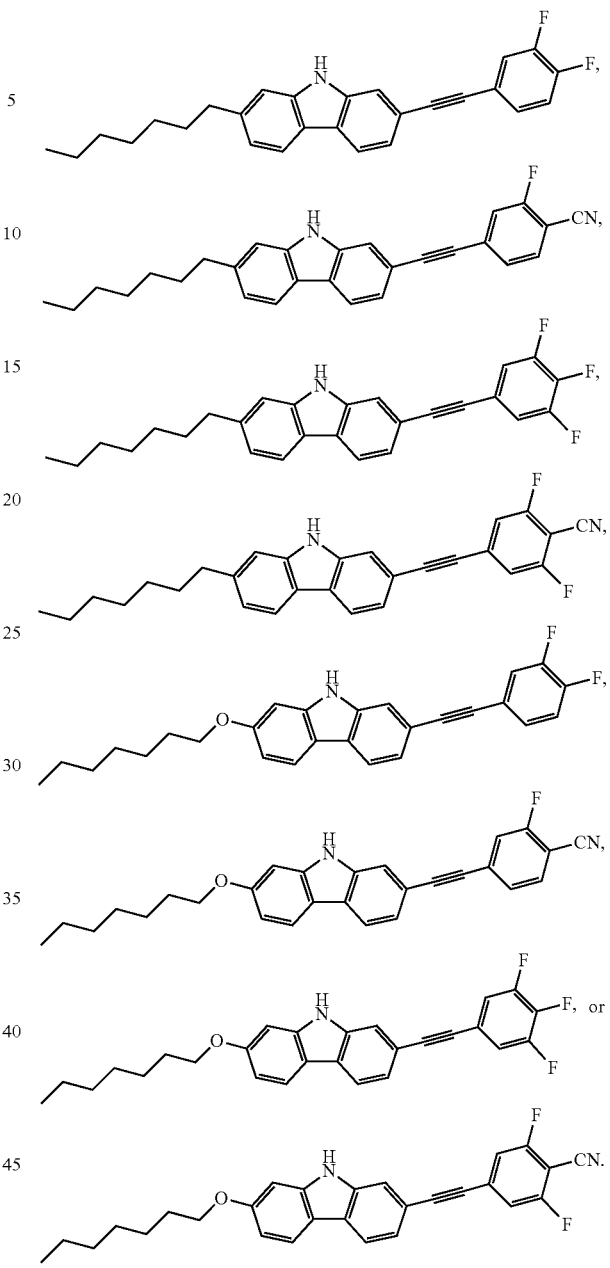

In some embodiments, the substituents, such as X, Y, R$^1$, R$^2$, R$^3$, R$^4$, R$^5$, R$^6$, R$^7$, or R$^8$ of the compound of Formula I, III or IV, in the liquid crystal composition can result in a positive dielectric anisotropic compound. In some embodiments, the substituents, such as X, Y, R$^1$, R$^2$, R$^3$, R$^4$, R$^5$, R$^6$, R$^7$, or R$^8$ of the compound of Formula I, III, or IV, in the liquid crystal composition can result in a negative dielectric anisotropic compound.

In some embodiments, the liquid crystal composition comprising the aforementioned liquid crystal compounds that have a molecular aspect ratio of at least about 2, at least about 3, or at least about 3.5.

In some embodiments, the liquid crystal composition comprising the aforementioned liquid crystal compounds that have a molecular aspect ratio of up to about 6, up to about 7, up to about 10, or up to about 12.

III. Liquid Crystal Mixture in the Composition

Some embodiments include a liquid crystal composition comprising a nematic liquid crystalline mixture. In some embodiments, the liquid crystal composition, comprising a compound of Formula I, can further comprise at least one additional liquid crystal compound. In some embodiments, the additional liquid crystal compound is represented by Formula II:

With respect to any relevant structural representation, such as Formula II, $X^1$ is a substituted phenyl, substituted biphenyl, substituted (benzoyloxy)-yl, or substituted phenoxycarbonyl-yl. In some embodiments, $X^1$ is:

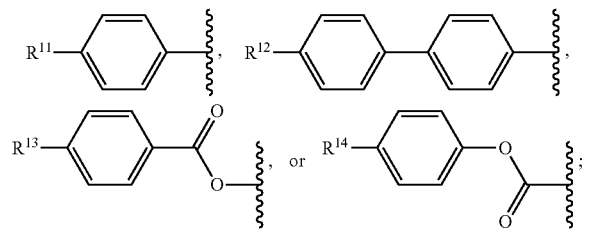

wherein $R^{11}$, $R^{12}$, $R^{13}$, and $R^{14}$ are independently alkyl, alkoxy, or any substituent. In some embodiments, $R^{11}$, $R^{12}$, $R^{13}$, and $R^{14}$ are independently $C_{3-9}$ alkyl or $C_{3-9}$ alkoxy. In some embodiments, $R^{11}$, $R^{12}$, $R^{13}$, or $R^{14}$ are independently —$C_{3-9}$ alkyl, such as $C_5$ alkyl, $C_3$ alkyl, or $C_8$ alkyl. In some embodiments, $R^{11}$, $R^{12}$, $R^{13}$, or $R^{14}$ are independently $C_{3-9}$ alkoxy, such as $C_3$ alkoxy, $C_5$ alkoxy, or $C_8$ alkoxy. In some embodiments, $R^{11}$, $R^{12}$, $R^{13}$, or $R^{14}$ are independently —$C_3H_7$. In some embodiments, $R^{11}$, $R^{12}$, $R^{13}$, or $R^{14}$ are independently —$C_5H_{11}$. In some embodiments, $R^{11}$, $R^{12}$, $R^{13}$, or $R^{14}$ are independently —O—$C_3H_7$O. In some embodiments, $R^{11}$, $R^{12}$, $R^{13}$, or $R^{14}$ are independently —O—$C_5H_{11}$. In some embodiments, $R^{11}$, $R^{12}$, $R^{13}$, or $R^{14}$ are independently —O—$C_8H_{17}$.

With respect to any relevant structural representation, such as Formula II, $Y^1$ is $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$. In some embodiments, $Y^1$ is —CN or $C_{1-8}$ alkyl. In some embodiments, $Y^1$ is —CN. In some embodiments, $Y^1$ is $C_{1-8}$ alkyl. In some embodiments, $Y^1$ is —$C_5H_{11}$.

In some embodiments, the liquid crystal mixture comprises one or more of the following compounds or optionally substituted compounds thereof:

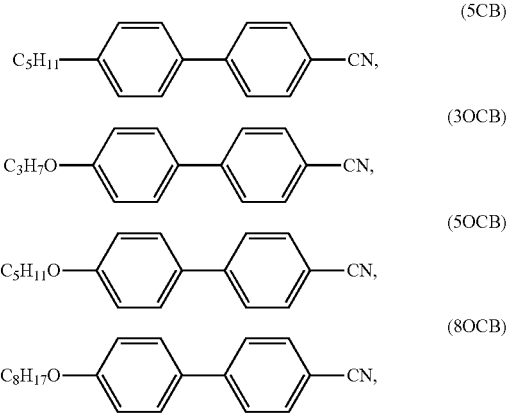

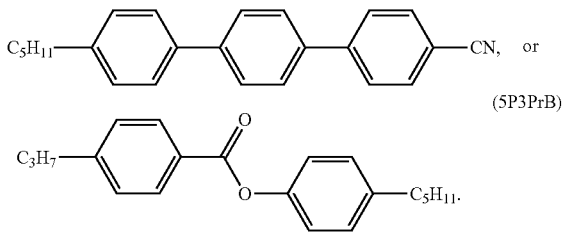

In some embodiments, the weight percentages of the individual compounds in the liquid crystal mixture are chosen such that the total weight percentage of the liquid crystal mixture is equal to 100 wt %.

Some embodiments include a liquid crystal composition containing a liquid crystal mixture comprising 5CB. In some embodiments, the weight percentage of 5CB relative to the total weight of the liquid crystal mixture can be about 0-60 wt %, about 0-50 wt %, about 20-50 wt %, about 30-45 wt %, about 10-20 wt %, about 20-30 wt %, about 30-40 wt %, about 40-50 wt %, about 50-60 wt %, about 25-35 wt %, or about 35-45 wt %, or any weight percentage in a range bounded by any of these values.

Ranges or values of the weight percentage of 5CB relative to the total weight of the liquid crystal mixture as described above that encompass the following weight percentages are of particular interest: about 30 wt %, about 34 wt %, and about 41 wt %.

Some embodiments include a liquid crystal composition containing a liquid crystal mixture comprising 3OCB. In some embodiments, the weight percentage of 3OCB relative to the total weight of the liquid crystal mixture can be about 0-25 wt %, about 5-20 wt %, about 10-17 wt %, about 5-10 wt %, about 10-15 wt %, about 15-20 wt %, about 20-25 wt %, about 10-11 wt %, about 11-13 wt %, about 13-15 wt %, or about 14-15 wt %, or any weight percentage in a range bounded by any of these values.

Ranges or values of the weight percentage of 3OCB relative to the total weight of the liquid crystal mixture as described above that encompass the following weight percentages are of particular interest: about 10.5 wt %, about 12 wt %, and about 14.5 wt %.

Some embodiments include a liquid crystal composition containing a liquid crystal mixture comprising 5OCB. In some embodiments, the weight percentage of 5OCB relative to the total weight of the liquid crystal mixture can be about 0-20 wt %, about 5-15 wt %, about 7-13 wt %, about 0-5 wt %, about 5-10 wt %, about 10-15 wt %, about 15-20 wt %, about 8-11 wt %, about 7-9 wt %, about 8-10 wt %, about 10-12 wt %, about 7-8 wt %, about 8-9 wt %, about 9-10 wt %, or 10-11 wt %, or about 11-12 wt %, or any weight percentage in a range bounded by any of these values.

Ranges or values of the weight percentage of 5OCB relative to the total weight of the liquid crystal mixture as described above that encompass the following weight percentages are of particular interest: about 8 wt %, about 9 wt %, and about 11 wt %.

Some embodiments include a liquid crystal composition containing a liquid crystal mixture comprising 8OCB. In some embodiments, the weight percentage of 8OCB relative to the total weight of the liquid crystal mixture can be about 0-25 wt %, about 5-20 wt %, about 10-17 wt %, about 5-10 wt %, about 10-15 wt %, about 15-20 wt %, about 20-25 wt %, about 10-11 wt %, about 11-12 wt %, about 12-13 wt %, about 13-14 wt %, about 14-15 wt %, about 11-13 wt %, or about 14-15 wt %, or any weight percentage in a range bounded by any of these values.

Ranges or values of the weight percentage of 8OCB relative to the total weight of the liquid crystal mixture as described above that encompass the following weight percentages are of particular interest: about 10.5 wt %, about 12 wt %, and about 14.5 wt %.

Some embodiments include a liquid crystal composition containing a liquid crystal mixture comprising 5CT. In some embodiments, the weight percentage of 5CT relative to the total weight of the liquid crystal mixture can be about 0-15 wt %, about 5-13 wt %, about 7-12 wt %, about 0-5 wt %, about 5-10 wt %, about 10-15 wt %, about 6-8 wt %, about 7-9 wt %, or 9-11 wt %, about 6-7 wt %, about 7-8 wt %, about 8-9 wt %, or about 9-10 wt %, or about 7-10 wt %, or any weight percentage in a range bounded by any of these values.

Ranges or values of the weight percentage of 5CT relative to the total weight of the liquid crystal mixture as described above that encompass the following weight percentages are of particular interest: about 7 wt %, about 8 wt %, and about 10 wt %.

Some embodiments include a liquid crystal composition containing a liquid crystal mixture comprising 5P3PrB. In some mixtures, the weight percentage of 5P3PrB relative to the total weight of the liquid crystal mixture can be about 0-40 wt %, about 0-30 wt %, about 15-30 wt %, about 0-10 wt %, about 10-20 wt %, about 20-30 wt %, about 30-40 wt %, about 5-15 wt %, about 15-25 wt %, about 25-35 wt %, about 35-40 wt %, about 10-15 wt %, about 15-20 wt %, about 20-25 wt %, about 25-30 wt %, about 30-35 wt %, about 14-16 wt %, or about 24-26 wt %, or any weight percentage in a range bounded by any of these values.

Ranges or values of the weight percentage of 5P3PrB relative to the total weight of the liquid crystal mixture as described above that encompass the following weight percentages are of particular interest: 15 wt % and 25 wt %.

Some embodiments include a liquid crystal composition comprising a liquid crystal compound of Formula I, such as LC-1 described in Example 2.1, 5CB, 3OCB, 5OCB, 8OCB, 5CT, or 5P3PrB, or a combination thereof. For some liquid crystal mixtures, the weight percentage of 5CB relative to the total weight of the liquid crystal mixture can be about 30-45 wt %, such as about 30 wt %, about 34 wt %, or about 41 wt %; the weight percentage of 3OCB relative to the total weight of the liquid crystal mixture can be about 10-17 wt %, such as about 10.5 wt %, about 12 wt %, or about 14.5 wt %; the weight percentage of 5OCB relative to the total weight of the liquid crystal mixture can be about 7-13 wt %, such as about 8 wt %, about 9 wt %, or about 11 wt %; the weight percentage of 8OCB relative to the total weight of the liquid crystal mixture can be about 10-17 wt %, such as about 10.5 wt %, about 12 wt %, or about 14.5 wt %; the weight percentage of 5CT relative to the total weight of the liquid crystal mixture can be about 7-12 wt %, such as about 7 wt %, about 8 wt %, or about 10 wt %; and the weight percentage of 5P3PrB relative to the total weight of the liquid crystal mixture can be about 0-30 wt %, such as 0 wt %, about 15 wt %, or about 25 wt %; wherein the weight percentages of the individual compounds in the mixture are chosen such that the total weight percentage of the liquid crystal mixture in the liquid crystal composition is 100 wt %.

In some embodiments, the liquid crystal composition can further comprise a chiral dopant. In some embodiments, the chiral dopant can comprise a branched biphenyl, optionally substituted with a alkyl compound, such as 4'-(2-methylbutyl)-[1,1'-biphenyl]-4-carbonitrile (CB-15). In some embodiments, the chiral dopant can comprise a di-benzoate based compound, such as (S)-octan-2-yl 4-((4-(hexyloxy)benzoyl)oxy)benzoate (S-811 or ZLI-0811), R-octan-2-yl 4-((4-(hexyloxy)benzoyl)oxy)benzoate (R-811 or ZLI-3786), (S)-1-phenylethane-1,2-diyl bis(4-(4-pentylcyclohexyl)benzoate) (S-1011 or ZLI-4571), or (R)-1-phenylethane-1,2-diyl bis(4-(4-pentylcyclohexyl)benzoate) (R-1011 or ZLI-4572). In some embodiments, the chiral dopant can be (S)-octan-2-yl 4-((4-(hexyloxy)benzoyl)oxy)benzoate (S-811 or ZLI-0811) or (R)-octan-2-yl 4-((4-(hexyloxy)benzoyl)oxy)benzoate (R-811 or ZLI-3786). In some embodiments, the chiral dopant can comprise (R)-octan-2-yl 4-((4-(hexyloxy)benzoyl)oxy)benzoate (R-811 or ZLI-3786). In some embodiments, the chiral dopant can comprise unsubstituted 4'-(2-methylbutyl)-[1,1'-biphenyl]-4-carbonitrile (CB-15). In some embodiments, the weight percentage of the chiral dopant relative to the total weight of the composition can be about 0-10 wt %, about 0-5 wt %, about 5-10 wt %, about 1-2 wt %, about 2-3 wt %, about 3-4 wt %, about 4-5 wt %, about 5-7 wt %, about 7-10 wt %, about 1-5 wt %, or about 2-4 wt %, such as about 3 wt %.

IV. Liquid Crystal Element

Generally, a liquid crystal element comprises a transparency changing layer and at least two alignment layers bounded on each side of the transparency changing layer, and the transparency changing layer comprises any one of the liquid crystal compositions described herein. For example, as depicted in FIG. 1A or FIG. 1B, liquid crystal element 100 can comprise transparency changing layer 110 and at least two alignment layers 120. The two alignment layers are bounded on each side of the transparency changing layer. Any of the aforementioned layers can further comprise dispersants, plasticizers, binders, and/or solvents.

The transparency changing layer can comprise any one of the liquid crystal compositions described herein. For example, in FIG. 1A or FIG. 1B, transparency changing layer 110 can comprise a liquid crystal composition 111. Composition 111 can comprise positive dielectric anisotropic compound 113, such as LC-1, LC-2, LC-3, or LC-4 described herein, as shown in FIG. 1A. Composition 111 can comprise negative dielectric anisotropic compound 114, as shown in FIG. 1B. The composition can comprise a positive dielectric anisotropic compound and a negative dielectric anisotropic compound. Additionally, the transparency changing layer comprising the liquid crystal composition can further comprise a polymer, and the composition is dispersed in the polymer. For example, in FIG. 1A or FIG. 1B, composition 111 forms droplets and, suspended within polymer matrix 112. Such a transparency changing layer can be described as a polymer dispersed liquid crystal (PDLC). Some transparency changing layers can further comprise spacers. For example, in FIG. 1A or FIG. 1B, transparency changing layer 110 comprises multiple spacers 115. The liquid crystal element described herein can be opaque to visible light, but turn transparent upon the application of an electric field, which is characterized as normal mode PDLC. Some liquid crystal elements can be transparent to visual light but opaque upon the application of an electric field, which is characterized as reverse mode element.

Some embodiments include a transparency changing layer comprising a polymer and a liquid crystal composition dispersed in the polymer. The polymer can be prepared from polymer precursors and initiators, which are then polymerized in situ. The polymer precursors may comprise monomers, oligomers, or any combination thereof. The polymer can be a photopolymer. The photopolymer can be prepared from polymer precursors and a photo-initiator. The polymer can be a thermoplastic polymer. The thermoplastic polymer can be prepared from polymer precursors and a thermal initiator. The photopolymer can comprise a UV-curable polymer or a visual light based photopolymer. The polymer can comprise a combination of a thermoplastic polymer and a photo/UV-curable polymer.

The weight ratio of liquid crystal compound to polymer can be about 1-25, about 3-15, about 1-5, about 5-10, about 10-15, about 15-20, about 20-25, about 6-10, about 7-11, about 8-10, or about 9.

The monomers described herein can comprise styrene, vinyl ethers, N-vinyl carbazoles, lactones, lactams, cyclic ethers, cyclic acetals, cyclic siloxanes, or combinations thereof. In some embodiments, the oligomer can comprise acrylates and/or methacrylates. In some embodiments, the oligomer can comprise diethylene glycol diacrylate, diethylene glycol dimethacrylate, triethylene glycol diacrylate, diethylene glycol dim ethacrylate, triethylene glycol diacrylate, triethylene glycol dimethacrylate, trimethylol propane, diallyl ether, trimethylolpropane triacrylate, pentaerythritol triacrylate, pentaerithritol tetracrylate, pentaerythol pentacrylate, dipentaerythrytol hydroxy pentacrylate, methyl methacrylate, acrylonitrile, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), 1,6-hexanediol diacrylate (HDDA), poly(ethylene glycol) dimethacrylate, or combinations thereof. In some embodiments, the monomer can comprise Paliocolor® LC-242, Paliocolor® LC-756, Paliocolor® LC-1057, Merck RM-691, Merck RM-257, or combinations thereof. In some embodiment, the acrylate monomer can comprise a monomer selected from: Synthon Chem ST04666, Synthon Chem. ST05953, Synthon Chem. ST03021, Synthon Chem. ST06132, Synthon Chem. ST04674, Synthon Chem. ST00975, Synthon Chem. ST04315, Synthon Chem. ST03776, Synthon Chem. ST04321, Synthon Chem. ST01011, DIC Corp UCL-001-K1, DIC Corp. UCL-001-NT1. In some embodiments, the monomer can comprise BASF Paliocolor® LC-242. In some embodiments, the monomer can comprise Merck RM 257. In some embodiments, the monomer can comprise both BASF Paliocolor® LC-242 and Merck RM 257.

In some embodiments, the photoinitiator can comprise a UV irradiation photoinitiator, which can also comprise a co-initiator. The photoinitiator can comprise α-alkoxydeoxybenzoin, α,α-dialkyloxydeoxybenzoin, α,α-dialkoxyacetophenone, α,α-hydroxyalkylphenone, O-acyl α-oximinoketone, dibenzoyl disulphide, S-phenyl thiobenzoate, acylphosphine oxide, dibenzoylmethane, phenylazo-4-diphenylsulphone, 4-morpholino-α-dialkylaminoacetophenone and combinations thereof. In some embodiments, the photoinitiator can comprise Irgacure® 184, Irgacure® 369, Irgacure® 500, Igracure® 651, Igracure® 907, Irgacure® 1117, Irgacure® 1700, Irgacure® TPO, 4,4'-bis(N,N-dimethylamino)benzophenone (Michlers ketone), (1-hydroxycyclohexyl) phenyl ketone, 2,2-diethoxyacetophenone (DEAP), benzoin, benzyl, benzophenone, or any combinations thereof. In some embodiments, the photoinitiator can comprise a blue-green and/or red sensitive photoinitiator. In some embodiments, the blue-green and/or red photoinitiator can comprise Irgacure® 784, dye rose bengal ester, rose Bengal sodium salt, campharphinone, methylene blue and the like. In some embodiments, co-initiators can comprise N-phenylglicine, triethylamine, thiethanolamine and any combinations thereof. The co-initiators are believed to be able to control the curing rate of the monomers such that the properties of the resulting polymer material may be manipulated. In some embodiments, the photoinitiator can comprise an ionic photoinitiator. The ionic photoinitiator can comprise a benzophenone, camphorquinone, fluorenone, xanthone, thioxanthone, benzyls, α-ketocoumarin, anthraquinone, terephthalophenone, and any combinations thereof. In some embodiments, the photoinitiator can comprise Igracure® 907. In some embodiments, the photoinitiator can comprise Igracure® TPO. In some embodiments, the photoinitiator can comprise Igracure® 651.

Some embodiments include a thermal initiator. In some embodiments, the thermal initiator can comprise: 4,4'-Azobis(4-cyanovaleric acid) (ACVA); α,α-azobisisobutyronitrile; 1,1'-azobis(cyclohexanecarbonitrile) (ACHN); ammonium persulfate; hydroxymethanesulfinic acid monosodium salt dihydrate (sodium formaldehydesulfoxylate); potassium persulfate; sodium persulfate; tert-butyl hydroperoxide; tert-butyl peracetate; cumene hydroperoxide; 2,5-di(tert-butylperoxy)-2,5-dimethyl-3-hexyne; dicumyl peroxide; 2,5-bis(tert-butylperoxy)-2,5-dimethylhexane (Luperox® 101, Luperox® 101XL45); 2,4-pentanedione peroxide (Luperox® 224); 1,1-bis(tert-butylperoxy)-3,3,5-trimethylcyclohexane (Luperox® 231); 1,1-bis(tert-butylperoxy)cyclohexane (Luperox® 331M80, Luperox® 531M80); benzoyl peroxide (Luprox® A98, Luprox® AFR40, Luprox® ATC50); butanone peroxide (Luprox® DDM-9, Luprox® DHD-9); tert-butyl peroxide (Luprox® DI); lauroyl peroxide (Luprox® LP); tert-butyl peroxybenzoate (Luprox® P); tert-butylperoxy 2-ethylhexyl carbonate (Luprox® TBEC); tert-butyl hydroperoxide (Luprox® TBH70X), or any combinations thereof.

In some embodiments, the liquid crystal element can also comprise a surfactant. The surfactant can comprise octanoic acid, heptanoic acid, hexanoic acid, or any combinations thereof. In some embodiments, the surfactant can comprise acetylinic diol-based compounds, such as, tetramethyl decynediol in a 2-ethyl hexanol solvent (Surfynol® 104A), ethoxylated acetylenic diols (Dynol® 604), dodecylbenzene sulfonate (Witconate® P-1059), Witcoamide® 511, Witcoamide® 5138, Surfynol® CT-171, Surfynol® CT-111, Surfynol® CT-131, Surfynol® TG, DBE Microemulsion, Fluorad® FC-431, Fluorad® FC-430, Surfynol® 104A, Dynol® 604, or any combinations thereof.

In some embodiments, the transparency changing layer comprising a liquid crystal composition can be described as a polymer dispersed liquid crystal layer, wherein the liquid crystal composition forms droplets dispersed within the polymer matrix. In some embodiments, the liquid crystal droplets form suspended precipitates during the polymerization of polymer precursors. The droplets can have a uniform distribution, a gradient distribution, or a random distribution within the polymer matrix. In some embodiments, the droplets can have a uniform distribution within the polymer matrix.

In some embodiments, the transparency changing layer can also comprise spacers. The spacers can comprise beads. Spacers can be used to control the thickness of the liquid crystal element (i.e. defining the gap between the two alignment layers and the conducting substrates) as the spacers provide structural support to ensure a uniform thickness of the liquid crystal element. The spacers can comprise silica dioxide, i.e. glass. The spacers can comprise polymers. The polymers, which can be used as a spacer, can comprise divinylbenzene, polymethylmethacrylate, polybutymethacrylate, polymethylsilsesquioxane, polylaurylmethacrylate, polyurethane, polytetrafluoroethylene (Teflon), benzocyclobutene (BCB), amorphous fluoropolymer (Cytop), perfluorocyclobutene, or any combinations thereof. In some embodiments, the spacer beads may have an average bead diameter that is about 1-60 µm, about 1-50 µm, about 1-5 µm, about 1-10 µm, about 10-20 µm, about 20-30 µm, about 30-40 µm, about 40-50 µm, about 50-60 µm, at least about 1 µm, at least about 5 µm, at least about 10 µm, at least about 15 µm, up to about 20 µm, or up to about 50 µm, or any average bead diameter in a range bounded by any of these values. In some embodiments, the spacers can be dispersed in a random distribution in the transparency changing layer. In some embodiments, the spacers can be dispersed uniformly in the transparency changing layer. In some embodiments, the liquid crystal element may contain spacers with an average spacer density of about 10-1000 spacers/in$^2$, about 10-500 spacers/in$^2$, about 500-1000 spacers/in$^2$, about 50-100 spacers/in$^2$, about 10-100 spacers/in$^2$, about 100-500 spacers/in$^2$, about 10 spacers/in$^2$, about 20 spacers in$^2$, about 25 spacers/in$^2$, about 50 spacers/in$^2$, about 100 spacers/in$^2$, about 200 spacers/in$^2$, about 500 spacers/in$^2$, about 1000 spacers/in$^2$, or any average spacer density in a range bounded by these values.

In some embodiments, the liquid crystal element can also comprise at least two alignment layers: a first alignment layer and a second alignment layer. The first and the second alignment layers can be bounded on each side of the transparency changing layer In other words, the alignment layers can be placed such that at least two alignment layers are in physical communication with both sides of the transparency changing layer with one alignment layer on one side of the transparency changing layer and the other alignment layer on the opposite side of the transparency changing layer.

The alignment layers can comprise a polyimide or a compound having a modified alkyl chain. In some embodiments, where the liquid crystal compound is characterized as having a positive dielectric anisotropy, the polyimide can be chosen such that the aforementioned liquid crystal compound is homogenously aligned with the substrate, or is oriented parallel to the substrate when no voltage is applied. In some embodiments, the homogenously aligned polyimide can comprise a polyimide that can be characterized as having a low pre-tilt angle. The pre-tilt angle is the angle formed between the substrate and the direction along the length of the liquid crystal compound in the presence of the polyimide. In some embodiments, the homogenously aligned polyimide can comprise a polyimide that has a pre-tilt angle of less than about 15 degrees, less than about 10 degree, less than about 5 degrees, about 0-15 degree, about 0-5 degree, about 1-5 degree, about 5-10 degree, about 10-15 degree, or any degree in a range bounded by any of these values. In some embodiments, the homogenous-alignment polyimide can comprise: AL3056, AL16301, AL17901, PI-2525, PI-2555, PI-2574, SE-141, SE-150, SE-4540, SE-6441, SE-7792, SE-8292, LX-1400, or any combinations thereof. It is believed that when a voltage is applied across the liquid crystal element, the liquid crystals will rotate from their pre-tilt positions in response to the electric field resulting in a change of refraction index as a result of the change in orientation of the individual molecules of the liquid crystal compound. The change of the refraction index within the suspended liquid crystal droplets can result in mismatch of refraction index between the droplets and the polymer, which in turn resulting in a haze or loss of transparency in the element due to light scatter. In some embodiments, where the liquid crystal compound may be characterized as having a negative dielectric anisotropy, the polyimide can be chosen such that the aforementioned liquid crystal compound is homeotropically aligned with the substrate, or oriented perpendicularly to the substrate when no voltage is applied. In some embodiments, the homeotropically aligned polyimide can comprise a polyimide that has a pre-tilt angle of about 85-90 degrees. In some embodiments the polyimide in homeotropic-alignment can comprise a polyimide that has a pre-tilt angle of about 90 degrees. In some embodiments, the polyimide in homeotropic-alignment can comprise a polyimide selected from PI 1211, S60702, S659, SE-1211, SE-5300, SE-5661, or combinations thereof. In some embodiments, the compound having a modified alkyl chain can comprise a $C_{10}$-$C_{30}$ alkyl chain where one of the end carbons is a tertiary amine salt. For example, the modified alkyl chain can comprise cetyltrimethyl ammonium bromide (CTAB, [($C_{16}H_{33}$)N($CH_3$)$_3$] Br). It is believed that when the voltage is reduced or removed, the intermolecular interactions can allow to restore the individual liquid crystal compounds' original orientations, thus, restoring the liquid crystal's refraction index to the original state and reducing mismatch and light scattering in the device.

The liquid crystal element can also comprise dispersants such as ammonium salts, e.g., $NH_4Cl$; Flowlen; fish oil; long chain polymers; stearic acid; oxidized Menhaden Fish Oil (MFO); dicarboxylic acids such as but not limited to succinic acid, ethanedioic acid, propanedioic acid, pentanedioic acid, hexanedioic acid, heptanedioic acid, octanedioic acid, nonanedioic acid, decanedioic acid, o-phthalic acid, and p-phthalic acid; sorbitan monooleate; and any mixtures thereof. In some embodiments, the dispersant can comprise oxidized MFO.

The liquid crystal element can also comprise plasticizers, which include type 1 plasticizers that can generally decrease the glass transition temperature (Tg), making it more flexible, such as phthalates (n-butyl, dibutyl, dioctyl, butyl benzyl, missed esters, and dimethyl); and type 2 plasticizers that can enable more flexible, more deformable layers, and perhaps reduce the amount of voids resulted from lamination, e.g., glycols (polyethylene; polyalkylene; polypropylene; triethylene; or dipropylglycol benzoate).

Type 1 plasticizers can include, but are not limited to: butyl benzyl phthalate, dicarboxylic/tricarboxylic ester-based plasticizers, such as phthalate-based plasticizers, e.g. bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate, and any mixtures thereof; adipate-based plasticizers, such as bis(2-ethylhexyl) adipate, dimethyl adipate, monomethyl adipate, dioctyl adipate and any mixtures thereof; sebacate-based plasticizers, such as dibutyl sebacate, and maleate.

Type 2 plasticizers can include, but not limited to: dibutyl maleate, diisobutyl maleate, and a mixture thereof; polyalkylene glycols, such as polyethylene glycol, polypropylene glycol, and a mixture thereof. Other plasticizers which may be used include, but are not limited to, benzoates, epoxidized vegetable oils, sulfonamides such as N-ethyl toluene sulfonamide, N-(2-hydroxypropyl)benzene sulfonamide, N-(n-butyl)benzene sulfonamide; organophosphates, such as tricresyl phosphate, tributyl phosphate; glycols/polyethers such as triethylene glycol dihexanoate, tetraethylene glycol diheptanoate, and a mixture thereof; alkyl citrates, such as triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester, and any mixtures thereof.

The liquid crystal element can also comprise binders. In some embodiments, organic binders can be used. The organic binders can comprise vinyl polymers, such as but not limited to, polyvinyl butyral (PVB), polyvinyl alcohol (PVA), polyvinyl chloride (PVC), polyvinyl acetate (PVAc), polyacrylonitrile, any mixtures thereof, and any copolymers thereof; polyethyleneimine; poly(methyl methacrylate) (PMMA); polyvinyl chloride acetate (PVCA); and mixtures thereof. In some embodiments, the organic binder can comprise PVB.

The liquid crystal element can also comprise a solvent. In some embodiments, the solvent can comprise a polar solvent. The polar solvent can comprise water. In some embodiments, the solvent may comprise a non-polar solvent. The non-polar solvent may be an organic solvent. For example, the non-polar solvent may include, but is not limited to, a lower alkanol, such as methanol, isopropyl alcohol, xylenes, cyclohexanone, acetone, toluene, methyl ethyl ketone, and any mixtures thereof. In some embodiments, the non-polar solvent may be toluene.

V. Selectively Dimmable Device

Some embodiments include a selectively dimmable device comprising the liquid crystal element described above, at least two conductive substrates: a first conductive substrate and a second conductive substrate, and a voltage source. The first and second conductive substrates define a gap between them, and the liquid crystal element is disposed between the first and second conductive substrates within the gap. The substrates and the liquid crystal element are in electrical communication with the voltage source such that when a voltage is applied from the voltage source, an electric field is generated across the liquid crystal element. For example, in FIG. 2 or 3, the selectively dimmable device 200 can comprise at least two conductive substrates 210; a first substrate and a second substrate, the aforementioned liquid crystal element 100, and a voltage source. The first and the second conductive substrates 210 can define a gap between them, and the liquid crystal element 100 can be disposed between the first and second conductive substrates 10 within the said gap. The liquid crystal element, the conductive substrates, and the voltage source are all in electrical communication such that upon the application of a voltage from the voltage source, an electric field is applied across the liquid crystal element.

Figure 2:
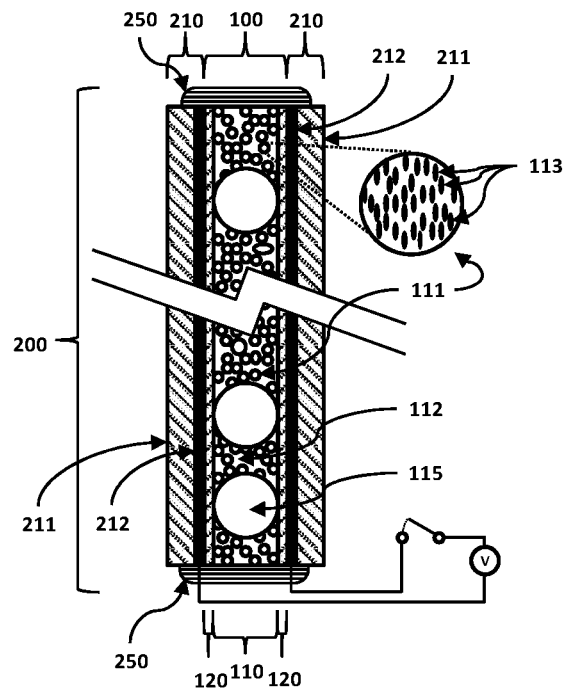
FIG. 2 is a depiction of an embodiment of a selectively dimmable device with a positive dielectric anisotropic polymer dispersed liquid crystal.
Figure 3:
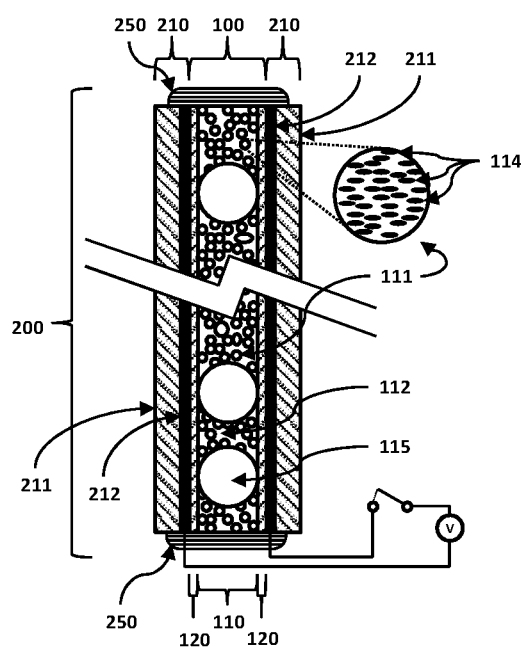
FIG. 3 is a depiction of an embodiment of a selectively dimmable device with a negative dielectric anisotropic polymer dispersed liquid crystal.
Figure 4:
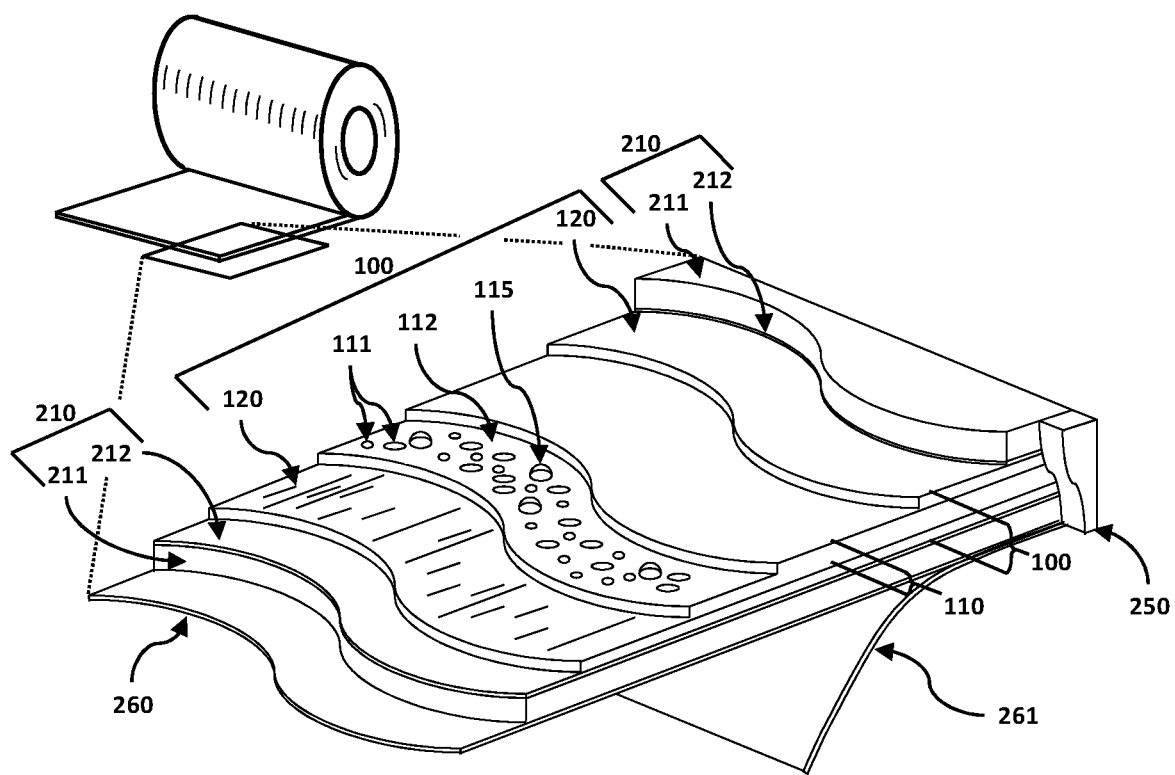
FIG. 4 is a depiction of an embodiment of a selectively dimmable device that comprises a flexible film. Such a film may be used alone or may be applied on existing windows.

In some embodiments, as shown in FIG. 2 or 3, the conductive substrates 210 can each comprise base 211, which can be either conductive or non-conductive. Each substrate 210 can further comprise electron conductive layer 212, which is in physical communication with the base 211. In some embodiments, the device can further comprise sealant 250 to protect the liquid crystal element from any potential damage from the environment. In some embodiments, as shown in FIG. 4, the device can further comprise adhesive layer 260 and removable backing 261 to allow ease of application to existing windows.

In some embodiments, the liquid crystal element in the device can be chosen such that when no electric field presents within the transparency changing layer, the refraction index of the liquid crystal composition and the refraction index of the polymer are similar to each other so that the total transmission of visible light allowed to pass through the device can be at least about 70%, at least about 75%, at least about 80%, at least about 85%, at least about 90%, at least about 95%, or at least about 98%, about 70-98%, about 70-80%, about 80-90%, about 90-95%, about 95-98%, or any percentage in a range bounded by any of these values. In some embodiments, when an electric field presents in the transparency changing layer after a voltage is applied to the electrical circuit, the refraction index of the liquid crystal and the refraction index of the polymer in the transparency changing layer can be different from each other. In this case, the incident light passing through the device is scattered; and at most about 70%, at most about 65%, at most about 60%, at most about 55%, at most about 50%, at most about 45%, at most about 40%, at most about 35%, at most about 30%, at most about 25%, at most about 15%, at most about 10%, at most about 5%, about 5-70%, about 5-10%, about 10-20%, about 20-30%, about 30-40%, about 40-50%, about 50-60%, or about 60-70%, of the visible light is allowed to pass through the device, or any percentage of the visible light in a range bounded by any of these values.

In some embodiments, the magnitude of the electric field necessary achieving scattering corresponds to applying a voltage of less than 120 V, less than 110 V, less than 100 V, less than 70 V, less than 50 V, less than 40 V, less than 30 V, less than 20 V, less than 15 V, less than 12 V, less than 10 V, less than 5V across the device, or about 5-120 V, about 5-60 V, about 60-120 V, about 5-30 V, about 30-60 V, about 60-90 V, about 90-120 V, about 5-15 V, about 15-25 V, about 25-35 V, about 35-45 V, about 45-55 V, about 55-65 V, about 65-85 V, about 85-100 V, about 100-120 V, or any voltage in a range bounded by any of these values.

In some embodiments, the electric field across the device is less than about 500 kV/m, less than about 1,000 kV/m, less than about 5,000 kV/m, less than about 10,000 kV/m, less than about 20,000 kV/m, less than about 40,000 kV/m, less than about 80,000 kV/m, about 1-250 kV/m, about 250-500 kV/m, about 500-750 kV/m, about 750-1000 kV/m, about 1000-5000 kV/m, about 5000-10,000 kV/m, about 10,000-20,000 kV/m, about 20,000-40,000 kV/m, or any electric field in a range bounded by any of these values.

The effectiveness of dimming of the device can also be represented by the percentage of haze, which generally can be defined as:

$$\text{Haze } [\%] = \frac{\text{Total Light Transmitted} - \text{Diffuse Light Transmitted}}{\text{Total Light Transmitted}} \times 100\%,$$

wherein the total light transmitted refers to the light from a known source and the diffuse light transmitted refers to the light transmitted through the liquid crystal element. In some embodiments, the haze of the device can be up to about 5%, up to about 10%, up to about 15%, up to about 20%, up to about 25%, up to about 30% when no voltage is applied to the device.

In some embodiments, the haze of the device can be at least about 40%, at least about 42%, at least about 45%, at least about 50%, at least about 55%, at least about 60%, at least about 65%, at least about 70%, at least about 75%, at least about 85%, at least about 90%, or at least about 95%, when a voltage of 25 volts or more is applied to achieve scattering. In some embodiments, the haze of the device can be at least about 50% when about 32.5 V of the voltage is applied. In some embodiments, the haze of the device can be at least 48% when about 30 V of the voltage is applied. In some devices, the haze can be about 42% when the voltage of about 25 V is applied.

Some embodiments include the selective dimmable device that can be semi-rigid, rigid, or flexible. When the conductive substrates in a selectively dimmable device comprise flexible materials, the selectively dimmable device can form a flexible sheet or film, as shown in FIG. 4, which can be applied onto the surface of a window. For example, the flexible device may be placed on one side of a glass window to provide a dimming capability. In some embodiments, the device can be rigid when the base comprises inflexible materials.

Some embodiments include the conductive substrates comprising a base. The base can comprise a conductive material. The conductive material can comprise conductive polymers. The conductive polymers can comprise poly(3,4-ethylenedioxythiophene) (PEDOT), poly(styrene sulfonate) (PSS), or a combinations thereof.

In some embodiments, each conductive substrate can further comprise an electron conductive layer and the conductive layer is in physical communication with the base. In some embodiments, the electron conductive layer is placed in a direct physical communication with the base, for example, the layer is on top of the base. In some embodiments, the electron conductive layer may be impregnated directly into the base (e.g. ITO glass), or sandwiched between two bases to form a single conductive substrate. When an electron conduction layer is present and is in direct physical communication with a base, the base can comprise a non-conductive material. The non-conductive material can comprise glass, polycarbonate, polymer, or a combination thereof. In some embodiments, the polymer in the substrate can comprise polyvinyl alcohol (PVA), polycarbonate (PC), acrylics including but not limited to Poly(methyl methacrylate) (PMMA), polystyrene, allyl diglycol carbonate (e.g. CR-39), polyesters, polyetherimide (PEI) (e.g. Ultem®), Cyclo Olefin polymers (e.g. Zeonex®), triacetylcellulose (TAC), polyethylene terephthalate (PET), polyethylene naphthalate (PEN), or any combinations thereof. In some embodiments, the substrate can comprise polyethylene terephthalate (PET), polyethylene naphthalate (PEN), or a combination thereof. In some embodiments, the electron conductive layer can comprise a transparent conductive oxide, a conductive polymer, metal grids, carbon nanotubes (CNT), graphene, or a combination thereof. The transparent conductive oxide can comprise a metal oxide. The metal oxide can comprise iridium tin oxide (IrTO), indium tin oxide (ITO), fluorine doped tin oxide (FTO), doped zinc oxide, or any combinations thereof. In some embodiments, the metal oxide can comprise indium tin oxide incorporated onto the base, e.g. ITO glass, ITO PET, or ITO PEN.

Some embodiments include a selectively dimmable device comprising a sealant. The sealant can encapsulate liquid crystal element between the conductive substrates to protect the element from any potential damage from the environment. The sealant can comprise a two-part real time cure epoxy, 3-Bond 2087, or the like. The sealant can comprise a UV-curable photopolymer, such as NOA-61, or the like. In some embodiments, the selectively dimmable device can also comprise an adhesive layer. The adhesive can comprise an optically clear adhesive (OCA). The OCA can comprise commercially available products, e.g. Nitto OCA tape or Scapa OCA tape. In addition, the selectively dimmable device can also comprise a removable carrier substrate which can be peeled away before application to protect the adhesive layer from contamination.

EMBODIMENTS

The following embodiments are specifically contemplated.

Embodiment 1. A liquid crystalline composition comprising a compound represented by the following formula:

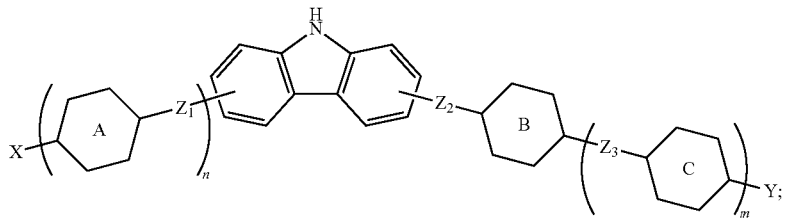

wherein the carbazol-diyl is optionally substituted with one or more of: $C_{1-6}$ alkyl, $C_{1-6}$ alkyloxy, —F, —$CF_3$, or —$OCF_3$;

Rings A, B, and C are independently optionally substituted 1,4-phenylene or a 1,4-cyclohexane-diyl, wherein the 1,4-phenylene is optionally substituted with one or more of: $C_{1-6}$ alkyl, $C_{1-6}$ alkyloxy, —F, —$CF_3$, or —$OCF_3$;

$Z_1$, $Z_2$, and $Z_3$ are independently a bond, —$CH_2CH_2$—, —$CH_2O$—, —C(O)O—, —CH=CH—, —C≡C—, —$CH_2CHF$—, —$CH_2CF_2$—, —CHFCHF—, —$CF_2CHF$—, —$CF_2CF_2$—, —CHFO—, or —$CF_2O$—;

X is $C_{2-12}$ alkyl, $C_{2-12}$ alkyloxy, or —S—$C_{2-12}$ alkyl;

Y is —F, —CN, —$CF_3$, —$OCF_3$, —$OCF_2$, —NCS, $C_{1-10}$ alkyl, or $C_{1-10}$ alkyloxy;

n is 0 or 1; and m is 0 or 1.

Embodiment 2. The composition of embodiment 1, wherein the composition comprises a compound represented by the following formula:

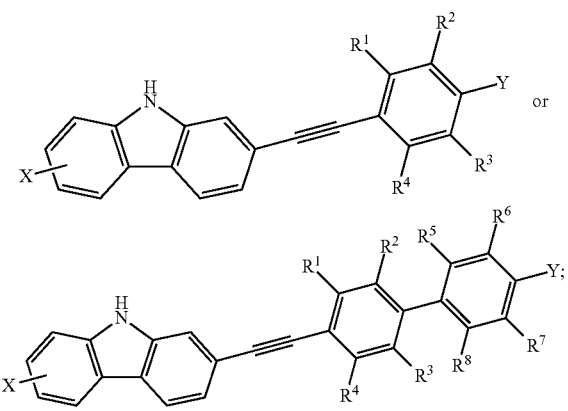

wherein the carbazol-diyl is optionally substituted with one or more of: $C_{1-6}$ alkyl, $C_{1-6}$ alkyloxy, —F, —$CF_3$, or —$OCF_3$;

X is $C_{2-12}$ alkyl, $C_{2-12}$ alkyloxy, or —S—$C_{2-12}$ alkyl;

Y is —F, —CN, —$CF_3$, —$OCF_2$, —$OCF_3$, —NCS, $C_{2-10}$ alkyl, or $C_{2-10}$ alkyloxy; and $R^1$, $R^2$, $R^3$, $R^4$, $R^5$, $R^6$, $R^7$, and $R^8$ are independently H, $C_{1-6}$ alkyl, $C_{1-6}$ alkyloxy, —F, —$CF_3$, or —$OCF_3$.

Embodiment 3. The composition of embodiment 1 or 2, wherein the carbazol-diyl is unsubstituted.

Embodiment 4. The composition of embodiment 3, wherein the carbazol-diyl is carbazol-2,7-diyl.

Embodiment 5. The composition of embodiment 1, 2, or 3, wherein X is:

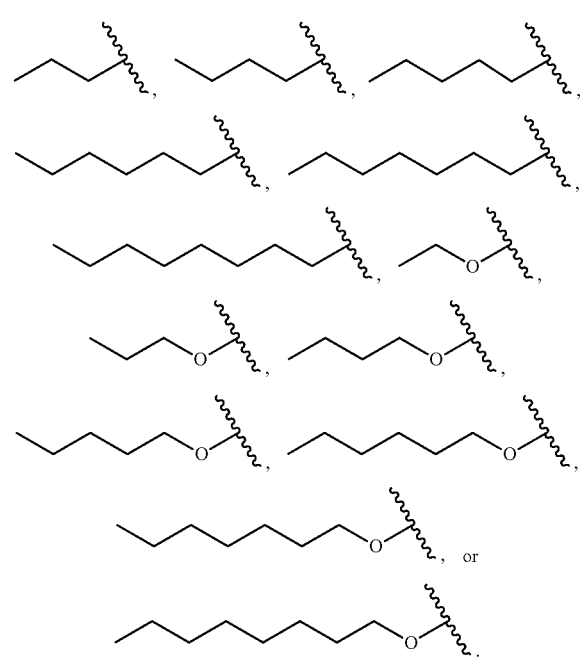

Embodiment 6. The composition of embodiment 1, 2, 3, 4, or 5, wherein X is:

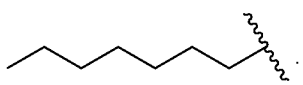 [SMILES: *CCCCCCC]

Embodiment 7. The composition of embodiment 1, 2, 3, 4, or 5, wherein X is:

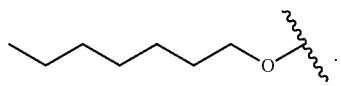 [SMILES: *OCCCCCCC]

Embodiment 8. The composition of embodiment 1, 2, 3, 4, 5, 6, or 7, wherein Y is —F.

Embodiment 9. The composition of embodiment 1, 2, 3, 4, 5, 6, or 7, wherein Y is —CN.

Embodiment 10. The composition of embodiment 1, 2, 3, 4, 5, 6, 7, 8, or 9, wherein the composition comprises a compound of:

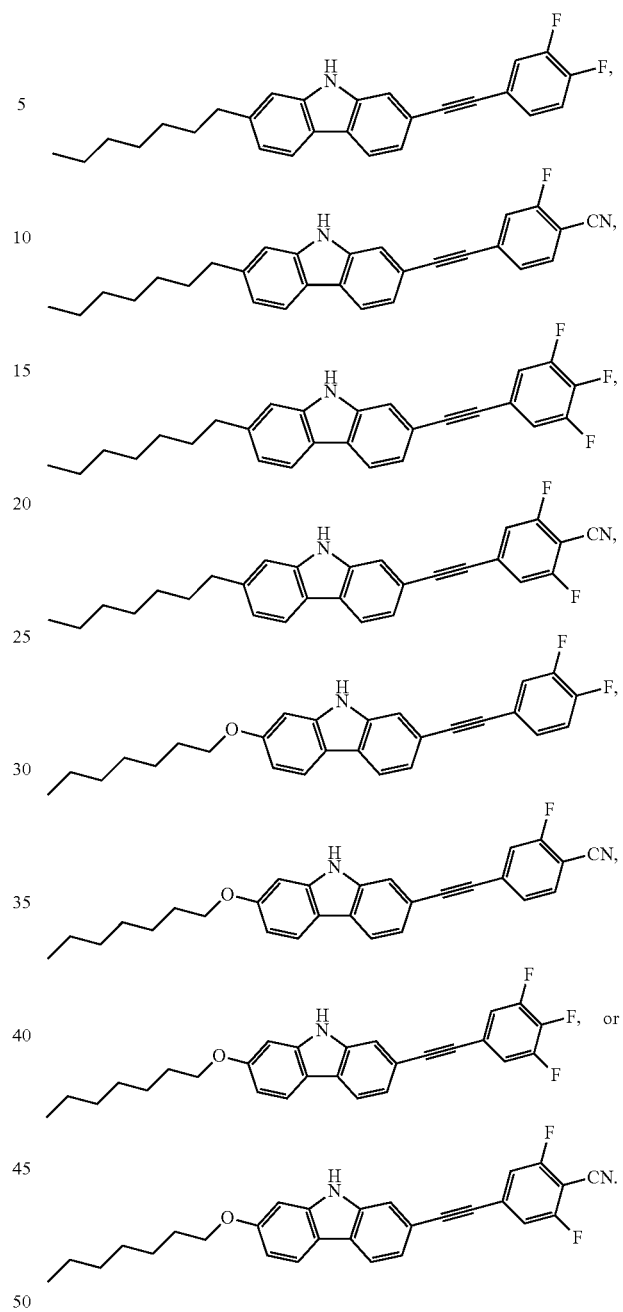

Embodiment 11. The composition of embodiment 1, further comprising at least one additional compound represented by the following formula:

wherein $X^1$ is substituted phenyl, substituted biphenyl, substituted benzoyloxy, or substituted phenoxycarbonyl;

$Y^1$ is —$C_{1-8}$ alkyl, —$C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, or —$C(O)NR^aR^b$; and $R^a$ and $R^b$ are independently H or optionally substituted —$C_{1-6}$ hydrocarbyl.

Embodiment 12. The composition of embodiment 11, wherein $X^1$ is:

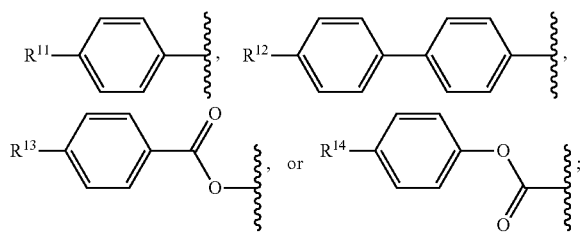

wherein $R^{11}$, $R^{12}$, $R^{13}$ and $R^{14}$ are independently alkyl or alkoxy.

Embodiment 13. The composition of embodiment 12, wherein $R^{11}$, $R^{12}$, $R^{13}$ and $R^{14}$ are independently $C_{3-9}$ alkyl or $C_{3-9}$ alkoxy.

Embodiment 14. The composition of embodiment 11, wherein $Y^1$ is $C_{1-8}$ alkyl.

Embodiment 15. The composition of embodiment 11, wherein $Y^1$ is —CN.

Embodiment 16. The composition of embodiment 11, wherein the additional compound is:

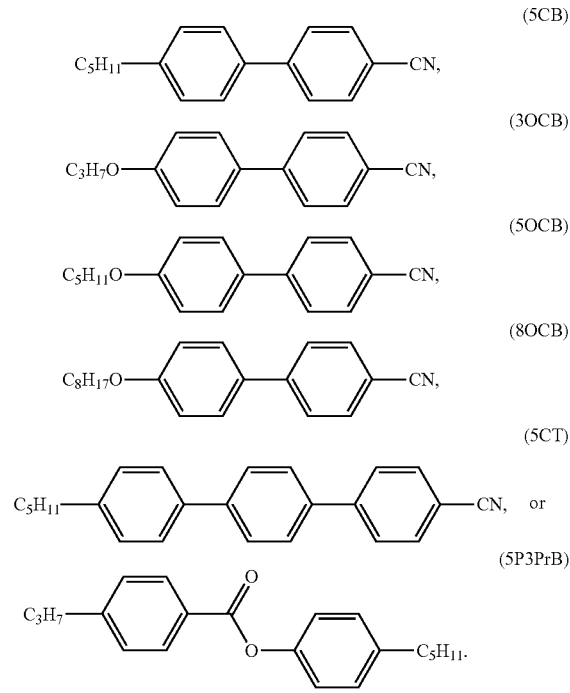

Embodiment 17. A liquid crystal element comprising:
a transparency changing layer; and
at least two alignment layers bounding each side of the transparency changing layer;
wherein the transparency changing layer comprises the composition of embodiment 1, 2, 3, 4, 5, 6, 7, 8, 9, 10, 11, 12, 13, 14, 15, or 16.

Embodiment 18. A selectively dimmable device comprising:
A liquid crystal element of embodiment 17;
at least two conductive substrates: a first conductive substrate and a second conductive substrate; and
a voltage source;

wherein the first conductive substrate and the second conductive substrate define a gap between them, and the liquid crystal element is disposed between the first conductive substrate and the second conductive substrate within the gap; and wherein the substrates and the liquid crystal element are in electrical communication with the voltage source, and an electric field is generated across the liquid crystal element when a voltage is applied from the voltage source.

Embodiment 19. The device of embodiment 18, having a haze of at most 5% when no voltage is applied.

Embodiment 20. The device of embodiment 18, having a haze of at least 40% when a voltage of at least 25 volts is applied across the device.

Embodiment 21. The device of embodiment 18, having a haze of at most 5% when no voltage is applied, and a haze of at least 40% when a voltage of at least 25 volts is applied across the device.

Embodiment 22. The device of embodiment 18, wherein the conductive substrates are flexible.

Embodiment 23. The device of embodiment 22, which is a flexible sheet.

EXAMPLES

It has been discovered that embodiments of the liquid crystal composition and related reverse-mode polymer dispersed liquid crystal elements and devices described herein can provide a selectively dimmable surface. The synthesis of these compositions and their applications are described in the following examples, which are intended to be illustrative of the embodiments of the disclosure only, but are not intended to limit the scope or underlying principles in any way. In general, the preparation of the compounds was performed under an argon atmosphere (Airgas, San Marcos, Calif. USA) inside of a fume-hood. In addition, where degassing is applied during the synthesis of the compounds, it can be performed by bubbling of argon gas (Airgas) through the reaction solutions or by applying vacuum followed by purging argon gas and repeating the process a few times.

Example 1.1: Synthesis of Precursor #1 (P-1)

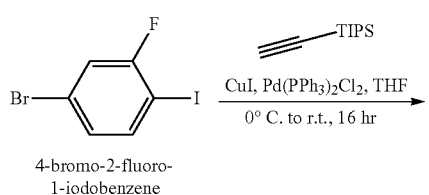

4-bromo-2-fluoro-1-iodobenzene

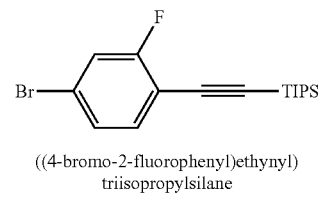

((4-bromo-2-fluorophenyl)ethynyl) triisopropylsilane ((4-bromo-2-fluorophenyl)ethynyl)triisopropylsilane (IC-1): To a solution of CuI (0.57 g, 3.0 mmol; Sigma Aldrich, St. Louis, Mo. USA), Pd(PPh$_3$)$_2$Cl$_2$ (0.7 g, 1.0 mmol; Aldrich), TEA (20.2 g, 0.2 mmol; Aldrich) and anhydrous THF (100 mL; Aldrich) cooled with an ice bath, 4-bromo-2-fluoro-1-iodobenzene (30.1 g, 100 mmol, Aldrich) was added to the mixture and stirred at 0° C. Then ethynyltrimethylsilane (18.23 g, 100 mmol; Aldrich) was added dropwise over a 1 hour period. The resulting mixture was then allowed to warm to room temperature and then stirred for 16 hours. The resulting mixture was then poured into diethyl ether (~50 mL; Aldrich). The resulting solution was filtered and rinsed three times with DI water (EMD Millipore, Billerica, Mass. USA). The layers were separated, and the organic layer was dried with anhydrous MgSO₄ (Aldrich). The crude product was purified by flash column with silica gel (Aldrich), eluting with hexanes (Aldrich) to give an oil product, ((4-bromo-2-fluorophenyl)ethynyl)triisopropylsilane, or IC-1 (35.5 g, 100% yield).

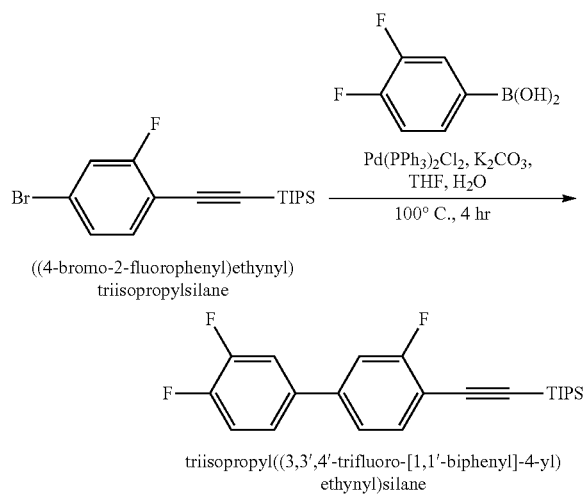

Triisopropyl((3,3',4'-trifluoro-[1,1'-biphenyl]-4-yl)ethynyl)silane (IC-2): A solution of Pd₂(PPh₃)₂Cl₂ (280 mg, 0.4 mmol; Aldrich), K₂CO₃ (5.6 g, 40 mmol; Aldrich), (3,4-difluorophenyl)boronic acid (3.8 g, 24 mmol; Aldrich) was added to a mixture of DI water (20 mL; Millipore) and THF (20 mL; Adrich) and then the mixture was degassed for 20 minutes. Then IC-1 (7.017 g, 20 mmol) was added and the mixture was degassed for an additional 20 minutes. Next, the reaction was heated to 100° C. for 4 hours. The resulting mixture was then cooled, and poured into DI water (300 mL; Millipore) and extracted with toluene (50 mL; Aldrich). The combined organic layers was washed twice with DI water (2×35 mL; Millipore), dried over anhydrous Na₂SO₄ (Aldrich) and concentrated in vacuo. The resulting residue was purified via flash chromatography on silica gel (Aldrich) eluting with 1:1 hexanes:Et₂O (Aldrich) to yield a colorless solid, triisopropyl((3,3',4'-trifluoro-[1,1'-biphenyl]-4-yl)ethynyl)silane, or IC-2 (4.41 g, 96.25% yield).

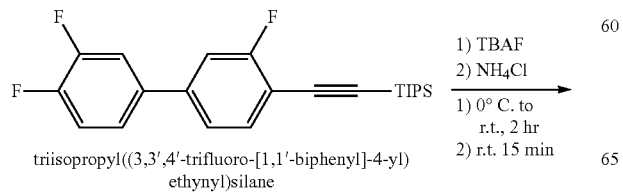

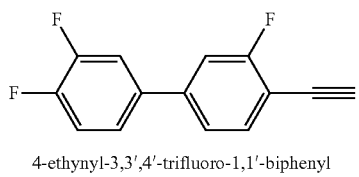

4-Ethynyl-3,3',4'-trifluoro-1,1'-biphenyl (P-1): To a solution of TBAF (1M in THF, 48.12 mL, 48.12 mmol; Aldrich) cooled with an ice bath was added a solution of IC-2 (7.48 g, 19.25 mmol) in THF (200 mL; Aldrich) over a 15 minute period. The resulting mixture was then allowed to warm to room temperature and stirred for 2 hours. Then the solution was poured into NH₄Cl aqueous solution (100 mL, sat. aq. sol.; Aldrich). The mixture was then stirred at room temperature for 15 minutes and then diluted with diethyl ether (200 mL; Aldrich), filtered, and then concentrated. The resulting residue was purified via flash chromatography on silica gel (Aldrich) eluting with 1:1 hexanes:Et₂O (Aldrich) to yield a colorless solid, 4-ethynyl-3,3'4'-trifluoro-1,1'-biphenyl, or P-1 (4.41 g, 98.7% yield). LCMS: [M+H]⁺=233. ¹H NMR (400 MHz, DMSO-d₆) δ7.89 (ddd, J=12.3, 7.8, 2.3 Hz, 1H), 7.71 (dd, J=11.3, 1.6 Hz, 1H), 7.66-7.60 (m, 2H), 7.60-7.49 (m, 2H), 4.58 (d, J=0.7 Hz, 1H).

Example 1.2: Synthesis of Precursor #2 (P-2)

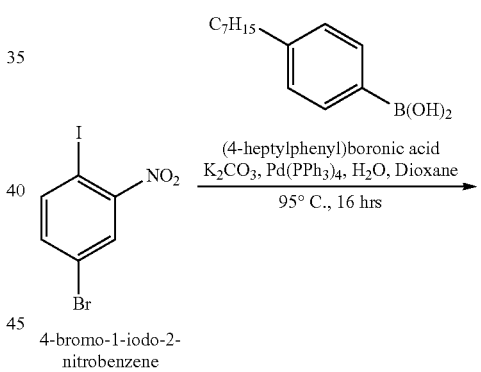

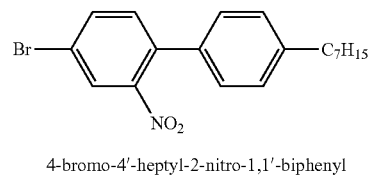

4-bromo-4'-heptyl-2-nitro-1,1'-biphenyl (P-2): A mixture of 4-bromo-1-iodo-2-nitrobenzene (3.289 g, 10.0 mmol; Aldrich), (4-heptylphenyl)boronic acid (2.641 g, 12.0 mmol; Aldrich), Pd(PPh$_3$)$_4$ (0.231 g, 0.2 mmol; Aldrich) and 1,4 dioxane (40 mL; Aldrich) was stirred and bubbled with Argon (Airgas) for 15 minutes at room temperature. A mixture of K$_2$CO$_3$ (2.764 g, 20.0 mmol; Aldrich) in DI water (10.0 mL; Millipore) was added to above mixture. The resulting mixture was bubbled with Argon (Airgas) for 15 minutes, then stirred at 65° C. for 16 hours. After cooling to room temperature, the mixture was poured to DI water (Millipore) and the product was then extracted into ethyl acetate (Aldrich). The organic layer was washed with DI water (Millipore), dried over anhydrous MgSO$_4$ (Aldrich), filtered, and concentrated to dryness under reduced pressure. The residue was purified by silica gel column chromatography with hexane:Ethyl acetate (95:5) (Aldrich) to gain a light yellow color liquid, P-2 (4.589 g, 63% yield). LCMS: M−H=376.

Example 1.3: Synthesis of Precursor #3 (P-3)

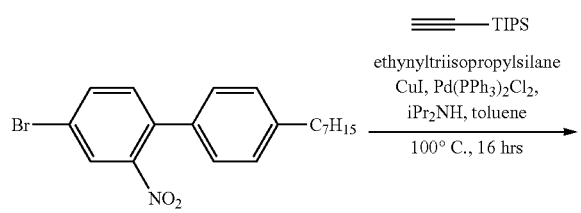

4-bromo-4'-heptyl-2-nitro-1,1'-biphenyl

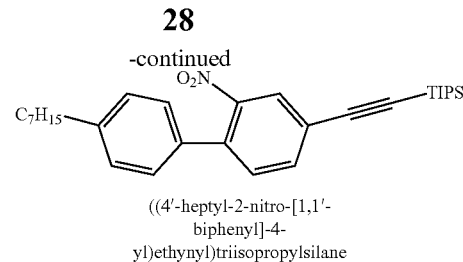

((4'-heptyl-2-nitro-[1,1'-biphenyl]-4-yl)ethynyl)triisopropylsilane

4'-Heptyl-2-nitro-[1,1'-biphenyl]-4-yl)ethynyl)triisopropylsilane (P-3): A mixture of P-2 (930 mg, 2.47 mmol), ethynyltriisopropylsilane (2.253 g, 12.35 mmol; Aldrich), CuI (47 mg, 0.120 mmol; Aldrich), Pd(PPh$_3$)$_2$Cl$_2$ (34 mg, 0.0494 mmol; Aldrich) and diisopropylamine (1.0 mL, 7.135 mmol; Aldrich) in toluene (5 mL; Aldrich) was bubbled with Argon (Airgas) for 15 minutes before being stirred at 100° C. under Nitrogen (Airgas) atmosphere for 16 hours. After cooling to room temperature, the mixture was filtered to remove the insoluble materials. The filtrate was then concentrated to dryness to gain a dark green color oil as a crude product, P-3 which was used in the next step without further purification. LCMS and NMR of crude confirmed the right structure (89% yield).

Example 2.1 Synthesis of Liquid Crystal #1 (LC-1)

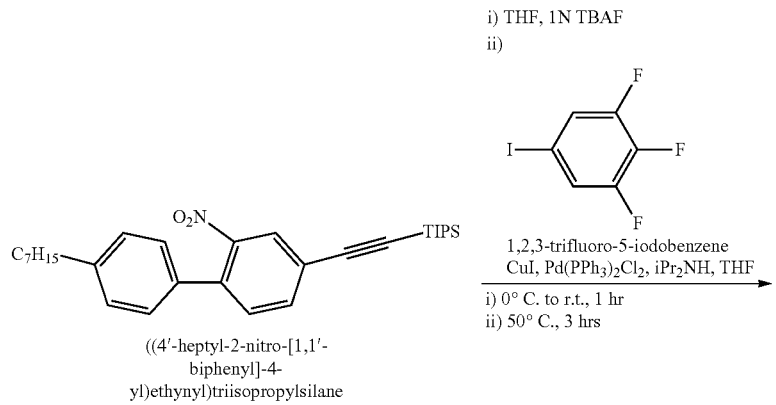

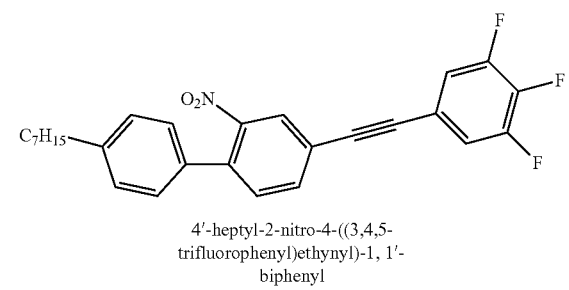

4'-heptyl-2-nitro-4-((3,4,5-trifluorophenyl)ethynyl)-1,1'-biphenyl

4'-Heptyl-2-nitro-4-(3,4,5-trifluorophenyl)ethynyl)-1,1'-biphenyl (IC-3): To a mixture of P-3 (1.15 g, 2.41 mmol) in THF (5 mL; Aldrich) was added a solution of TBAF in THF (1N, 4.8 mL, 4.8 mmol; Aldrich) cooled with an ice bath at 0° C. The resulting mixture was then stirred at room temperature for 1 hour until LCMS analysis confirmed the reaction was completed. Next, to the above mixture, 1,2,3-trifluoro-5-iodobenzene (520 mg, 2.01 mmol; Aldrich) was added followed by CuI (38.2 mg, 0.201 mmol; Aldrich), Pd(PPh$_3$)$_2$Cl$_2$ (28.2 mg, 0.0402 mmol; Aldrich) and diisopropylamine (1.0 mL, 7.135 mmol; Aldrich). The resulting mixture was then stirred and bubbled with Argon (Airgas) for 15 minutes at room temperature before being stirred at 50° C. for 3 hours. After cooling to room temperature, the mixture was poured into DI water (Millipore); the product was then extracted into ethyl acetate (Aldrich). The organic layer was then washed with DI water (Millipore), dried over anhydrous MgSO$_4$ (Aldrich), filtered and concentrated to dryness under reduced pressure. The crude product was purified by silica gel column chromatography with hexane:ethyl acetate (95:5) (Aldrich) to gain a light yellow solid, or IC-3 (93% yield). LCMS: [M+H]$^+$=451.

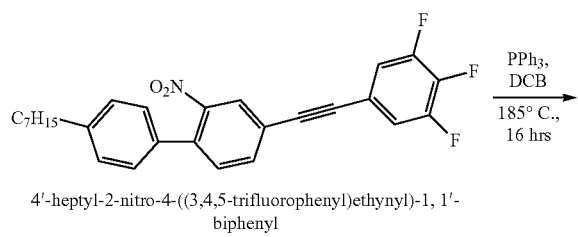

4'-heptyl-2-nitro-4-((3,4,5-trifluorophenyl)ethynyl)-1, 1'-biphenyl

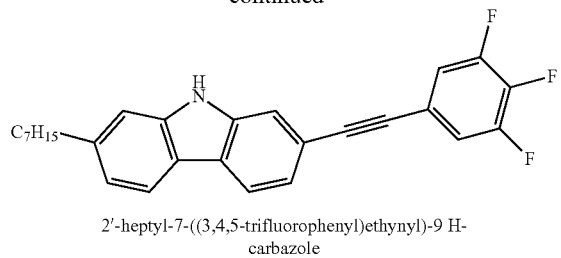

2'-heptyl-7-((3,4,5-trifluorophenyl)ethynyl)-9 H-carbazole

2-Heptyl-7-((3,3',4'-trifluoro-[1,1'-biphenyl]-4-yl)ethynyl)-9H-carbazole (LC-7) (Prophetic): A mixture of IC-3 (45.1 g, 1.00 mmol), and triphenyl-phosphine (789 mg, 3 mmol; Aldrich) in DCM (20 mL; Aldrich) can be placed in a sealed tube and heated to 185° C. for 16 hours. The mixture was concentrated under vacuum to generate a residue, which was then purified by silica gel column chromatography with hexanes:ethyl acetate (95:5) (Aldrich), and recrystallized from methanol (Aldrich) to give LC-1.

Example 2.2: Synthesis of Additional Liquid Crystal Compounds (Prophetic)

Using analogous methods to those described in Example 2.1, the following compounds can be synthesized by substituting (4-heptylphenyl)boronic acid with 4-alkyl-phenyl boronic acid, or 4-alkyloxy-phenyl boronic acid, and/or by substituting 1,2,3-trifluoro-5-iodo-benzene with a desired reagent such as a phenyl or a biphenyl moiety substituted with an iodo or a bromo group:

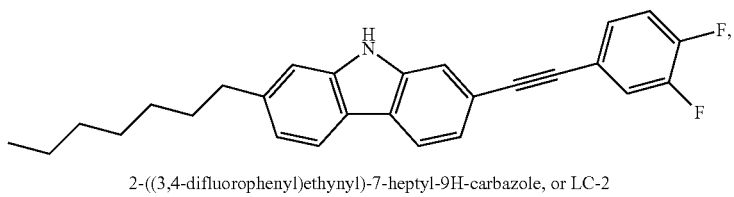

2-((3,4-difluorophenyl)ethynyl)-7-heptyl-9H-carbazole, or LC-2

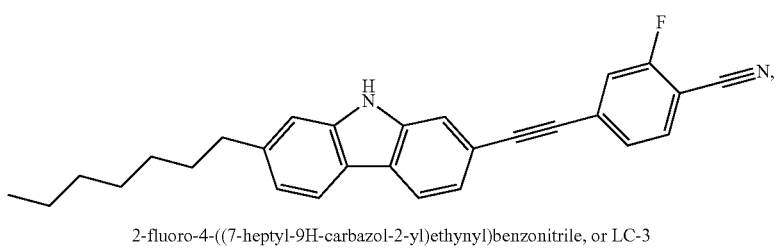

2-fluoro-4-((7-heptyl-9H-carbazol-2-yl)ethynyl)benzonitrile, or LC-3

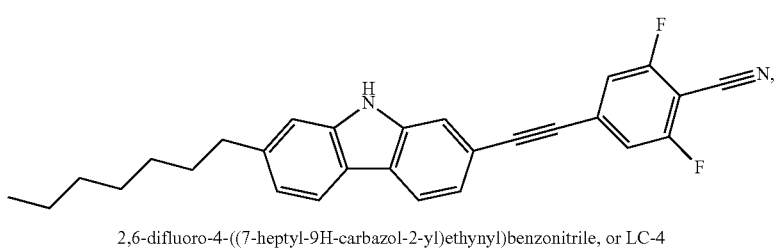

2,6-difluoro-4-((7-heptyl-9H-carbazol-2-yl)ethynyl)benzonitrile, or LC-4

-continued

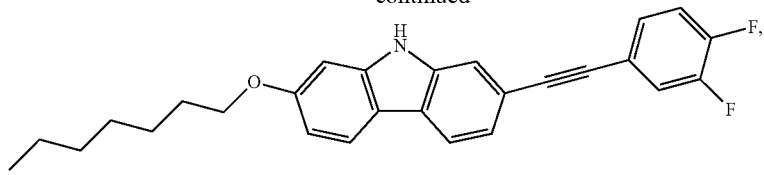

2-((3,4-difluorophenyl)ethynyl)-7-heptyloxy-9H-carbazole, or LC-5

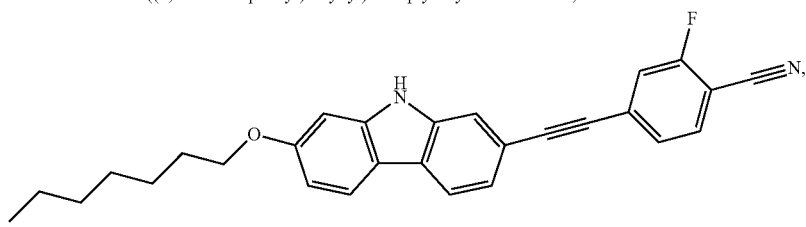

2-fluoro-4-((7-heptyloxy-9H-carbazol-2-yl)ethynyl)benzonitrile, or LC-6

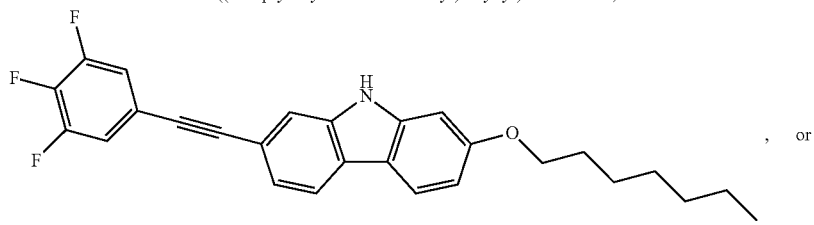

, or 2-(heptyloxy)-7-((3,4,5-trifluorophenyl)ethynyl)-9H-carbazole, or LC-7

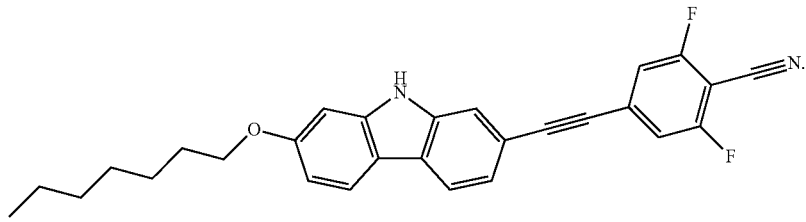

2,6-difluoro-4-((7-heptyloxy-9H-carbazol-2-yl)ethynyl)benzonitrile, or LC-8

Example 3.1 Composition Polarization (Prophetic)

The synthesized compounds can be examined with an optical microscope in a crossed polarization lighting condition to characterize their liquid crystal behavior and to study the composition's birefringence, or the difference between high and low refractive index of anisotropic liquid crystal molecules.

A microscope (BX-53F; Olympus, Tokyo, Japan) can be setup for polarizing microscopy with the analyzer attachment (U-PA, Olympus) rotated 90 degrees from the polarizer filter (BX45-PO, Olympus) all within the optical path from an adjustable 100 watt halogen light attachment (U-LH100HG, Olympus). In addition, to capture the images the microscope can also be equipped with a video camera adapter (U-TVO.35XC-2, Olympus) which can be further connected to a computer for capturing the images. For measurement, the samples can be placed on the microscope's stage placing it in the halogen lamp's optical path between the polarizer and the analyzer. Since the polarization between the analyzer and polarizer are completely mismatched by 90 degrees, if the sample is isotropic, e.g. glass, the light emitted from the source would be nearly completely blocked by the second polarizer because the unblocked polarized light exiting the first polarizer would not bend and would be subsequently blocked by the analyzer. The blockage of the remaining light by the mismatched analyzer is due to the inability of isotropic materials to change the polarization direction of light passing through them. However, if an anisotropic sample is placed between both polarizer films, the polarized light passing through the sample material can change polarization if the sample exhibits birefringence properties resulting in a light component that will not be blocked by the analyzer, or a detected interference pattern. Since glass is isotropic and has minimal effect light polarization, the liquid crystal compositions were sandwiched between two glass substrates during the measurements.

In addition to the microscope setup, a heating stage (FP 82 HT, Mettler Toledo, Columbus, Ohio, USA) and associated controller (FP 90, Mettler Toledo) can be used to heat the samples sandwiched in glass to preset temperatures right before measurements were taken. The purpose is to determine the birefringence properties of the samples at specific temperatures in order to determine their crystalline phase as a function of temperature.

If a nematic or smectic phase was present after cooling and the samples exhibited birefringence, it can be detected as a transformed light component at the microscope or an interference pattern of light. Conversely, an isotropic phase can be observed by the detection of no discernible light at the microscope, or darkness due to no transformation of light and subsequent blockage by the second polarizer.

For the measurements, selected liquid crystal compositions can be measured. Starting at 20° C., an image can be captured as baseline of the mixture phase. Then, during first heating cycle the liquid crystal molecules in the sample can be heated at a rate of 20° C. per minute until a black image is observed, which indicates an isotropic phase change, and the temperature can be then recorded. Then during cooling, when an interference color image is observed as a result of the samples transition back to nematic from isotropic, the phase transition temperature can be re-verified and an image can be recorded. Then, during the second heating cycle, the samples can be heated at a heating rate of 5° C. per min in order to more carefully and more accurately record the phase change temperatures.

Example 4.1: Fabrication of LC-Based Dimmable Device Using Capillary Method (Prophetic)

A selectively dimmable device based on a carbazolyl-based liquid crystal compound can be fabricated using a capillary method for filling the liquid crystal cell. A homogeneous-type liquid crystal test cell (KSRO-10/B107M1NSS05, E.H.C Co. Ltd, Tokyo, Japan) can be used for making the device. The test cell comprises two substrates with supports that define an active alignment area between the two substrates. The size of the glass/ITO substrate is 20 mm×25 mm with a sheet resistance about 100 Ω/sq and the active alignment area was about 10 mm×10 mm with a cell gap of 10 um. The cell can be procured pre-coated with a polyamide alignment layer (LX-1400, Hitachi-Kasei Shoji Co., Ltd., Tokyo, Japan) so no application of the alignment layers is necessary. As the geometry of the cell includes supports to ensure preservation of the cell gap, separate spacers are not required to be inserted into the cell before the application of the liquid crystals.

First, the test cell can be baked at 150° C. for 30 minutes to remove any impurities and any vapors inside the chamber before injection of the liquid crystal mixture. The liquid crystal mixture can be prepared by first mixing the desired liquid crystal composition corresponding to device DD-1 in Table 1 along with the disclosed amounts of polymer precursors, reactive mesogen, LC-242 (BASF Corporation, Florham Park, N.J., USA), chiral dopant, R-811 (Merck), and photo initiator, Irgacure 651 (BASF) in a vortex mixer followed by heating on a hot plate at or above the mixture clearing point and then cooling to about 80° C. to result in a liquid crystal mixture or a hot coating formulation.

Next, the test cells can be pretreated before the liquid crystal injection by warming the substrates at 80° C. for 5 minutes on a hot plate. Then, the hot coating formulation can be injected near the opening of the test cell. The solution can then be allowed to enter into the test cell by capillary action until it coated the entire active alignment area. In some embodiments, the test cell can be put on hot plate after injecting coating formulation to help ensure homogenous coverage of the liquid crystal. The resulting coated substrates can then be soft baked at 80° C. for 3 minutes on a hot plate to remove any residual solvent. After soft baking, a layered cell assembly can be formed, ready for ultraviolet (UV) radiation curing (UV-curing).

The layered cell assembly can be put on a stainless steel plate to provide a thermal sink so that the cell does not overheat during UV-curing. The assembly can then be cured under a UV LED (365 nm, LEDLB-4E-UV-365NM; Larson Electronics LLC, Kemp, Tex. USA) at an output of about 30 mW/cm$^2$ incident power for 3 minutes on each side to photopolymerize the LC-242. To keep the temperatures of the assembly from localized blooming as a by-product of the UV irradiation, the orientation of the sample can be switched at approximately 3-minute intervals by flipping the assembly over. The process results in an unsealed, dimmable assembly.

After UV-curing, the edges can be optionally sealed with a sealant to protect the liquid crystal element. After encapsulation, the assembly can then be baked in an oven at 80° C. for 30 minutes to generate a sealed, dimmable assembly.

Next, the dimmable assembly can be placed in electrical communication with a voltage source by attaching a conducting clamp and wire in electrical communication with a voltage source to each conductive substrate such that when a voltage is applied from the voltage source, an electrical field is applied across the liquid crystal.

The voltage source will provide the necessary electrical field across the device to rotate the dispersed liquid crystals resulting in a mismatch of the index of refraction in the liquid crystal element resulting in a selectively dimmable device DD-1.

Example 4.2: Fabrication of Additional LC-Based Dimmable Devices

Other devices were formulated using the same methodology as in Example 4.1 with the exception that the mass ratios and additives were varied according to Table 1. Suppliers for the individual compounds are the following: MLC-2142 (EMD Chemicals, Gibbstown, N.J., USA); 5CB, 3OCB, 5OCB, 8OCB, 5CT, and 5P3PrB (Qingdao QY Liquid Crystal Co., Ltd., Chengyang, Qingdao, China); and R-811 (Merck, Kenilworth, N.J. USA).

TABLE 1

Variances between the Fabricated Dimmable Elements.

| Element | Example | Liquid Crystal Components | Polymer | Polyimide | Dielectric Anisotropy | Process |
|---|---|---|---|---|---|---|
| DD-1 (P) | Example 4.1 | LC-1 (1 wt %)<br>5CB (34 wt %)<br>3OCB (12 wt %)<br>5OCB (9 wt %)<br>8OCB (12 wt %)<br>5CT (8 wt %)<br>5P3PrB (15 wt %) | LC-242 (5 wt %)<br>R-811 (3 wt %)<br>Igracure 651<br>(1 wt %) | LX-1400 | Positive | Layer |
| CDD-1 | Example 4.2 | 5CB (30 wt %)<br>3OCB (10.5 wt %)<br>5OCB (8 wt %)<br>8OCB (10.5 wt %)<br>5CT (7 wt %)<br>5P3PrB (25 wt %) | LC-242 (5 wt %)<br>R-811 (3 wt %)<br>Igracure 651<br>(1 wt %) | LX-1400 | Positive | Layer |

TABLE 1-continued

Variances between the Fabricated Dimmable Elements.

| Element | Example | Liquid Crystal Components | Polymer | Polyimide | Dielectric Anisotropy | Process |
|---|---|---|---|---|---|---|
| CDD-2 | Example 4.2 | 5CB (41 wt %) 3OCB (14.5 wt %) 5OCB (11 wt %) 8OCB (14.5 wt %) 5CT (10 wt %) | LC-242 (5 wt %) R-811 (3 wt %) Igracure 651 (1 wt %) | LX-1400 | Positive | Layer |

(P)-indicates prophetic example

Example 5.1: Optical Measurements (Prophetic)

The optical characteristics of the fabricated dimmable devices can be characterized by measuring the light allowed to pass through with and without an electric field present. Light transmittance data for the samples can be measured using a haze meter (HM-150; Murakami Color Research Laboratory, Tokyo, Japan) with each respective sample placed inside the device. The source can be directly measured without any sample present to provide a baseline measurement of total light transmitted. Then, the sample can be placed directly in the optical path, such that the emitted light can pass through the sample. Then the sample, connected to a voltage source (3PN117C Variable Transformer; Superior Electric, Farmington, Conn., USA) via electrical wires, one wire connected to each terminal and to a respective ITO glass substrate on the device such that an electric field would be applied across the device when a voltage source is applied, can be placed into the haze meter. Then, the emitted light transmitted through the samples can be measured at various magnitudes of voltage starting from 0 volts to an upper voltage from 12 volts to a maximum of 50 volts, depending on the behavior of the sample; with haze measurements taken at the different voltage levels.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A liquid crystalline composition comprising a compound represented by the following formula:

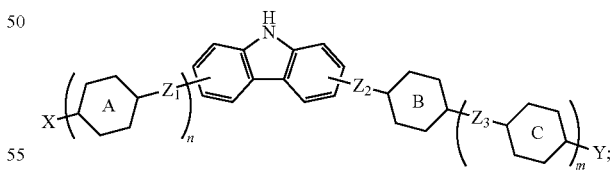

wherein

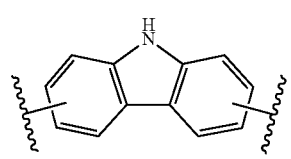

is optionally further substituted with one or more of: $C_{1-6}$ alkyl, $C_{1-6}$ alkyloxy, —F, —$CF_3$, or —$OCF_3$;

Rings A, B, and C are independently optionally substituted 1,4-phenylene or a 1,4-cyclohexane-diyl, wherein the 1,4-phenylene is optionally substituted with one or more of: $C_{1-6}$ alkyl, $C_{1-6}$ alkyloxy, —F, —$CF_3$, or —$OCF_3$;

$Z_1$, $Z_2$, and $Z_3$ are independently a bond, —$CH_2CH_2$—, —$CH_2O$—, —C(O)O—, —CH=CH—, —C≡C—, —$CH_2CHF$—, —$CH_2CF_2$—, —CHFCHF—, —$CF_2CHF$—, —$CF_2CF_2$—, —CHFO—, or —$CF_2O$—;

X is $C_{2-12}$ alkyl, $C_{2-12}$ alkyloxy, or —S—$C_{2-12}$ alkyl;

Y is —F, —CN, —$CF_3$, —$OCF_3$, —$OCF_2$, —NCS, $C_{1-10}$ alkyl, or $C_{1-10}$ alkyloxy;

n is 0 or 1; and m is 0 or 1.

2. The composition of claim 1, wherein the composition comprises a compound represented by the following formula:

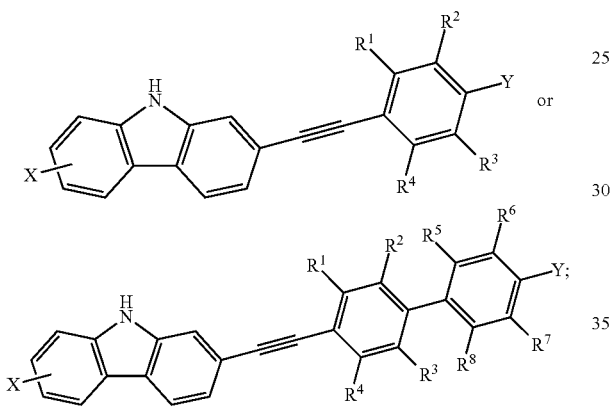

wherein

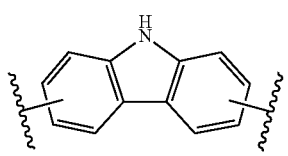

is further optionally substituted with one or more of: $C_{1-6}$ alkyl, $C_{1-6}$ alkyloxy, —F, —$CF_3$, or —$OCF_3$;

X is $C_{2-12}$ alkyl, $C_{2-12}$ alkyloxy, or —S—$C_{2-12}$ alkyl;

Y is —F, —CN, —$CF_3$, —$OCF_2$, —$OCF_3$, —NCS, $C_{2-10}$ alkyl, or $C_{2-10}$ alkyloxy; and $R^1$, $R^2$, $R^3$, $R^4$, $R^5$, $R^6$, $R^7$, and $R^8$ are independently H, $C_{1-6}$ alkyl, $C_{1-6}$ alkyloxy, —F, —$CF_3$, or —$OCF_3$.

3. The composition of claim 1, wherein

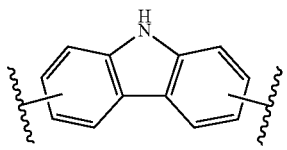

is unsubstituted.

4. The composition of claim 3, wherein

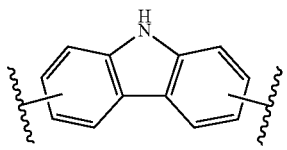

is carbazol-2,7-diyl.

5. The composition of claim 1, wherein X is:

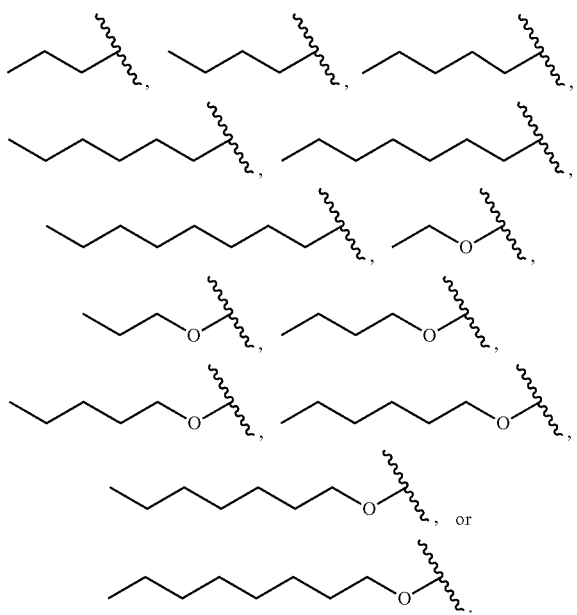

6. The composition of claim 1, wherein X is:

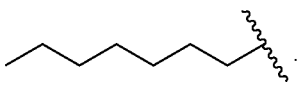 [SMILES: *CCCCCCC]

7. The composition of claim 1, wherein X is:

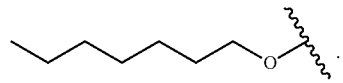 [SMILES: *OCCCCCCC]

8. The composition of claim 1, wherein Y is —F.

9. The composition of claim 1, wherein Y is —CN.

10. The composition of claim 1, wherein the composition comprises a compound of:

-continued

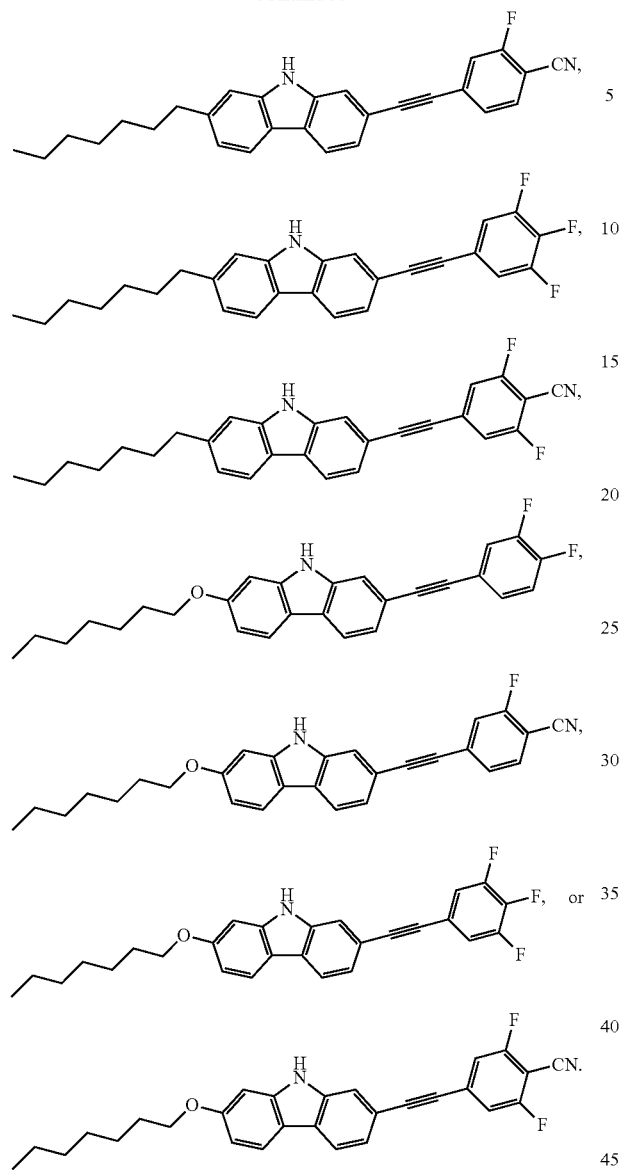

11. The composition of claim 1, further comprising at least one additional compound represented by the following formula:

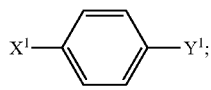

wherein $X^1$ is substituted phenyl, substituted biphenyl, substituted benzoyloxy, or substituted phenoxycarbonyl;

$Y^1$ is —$C_{1-8}$ alkyl, —$C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, or —$C(O)NR^aR^b$; and $R^a$ and $R^b$ are independently H or optionally substituted —$C_{1-6}$ hydrocarbyl.

12. The composition of claim 11, wherein $X^1$ is:

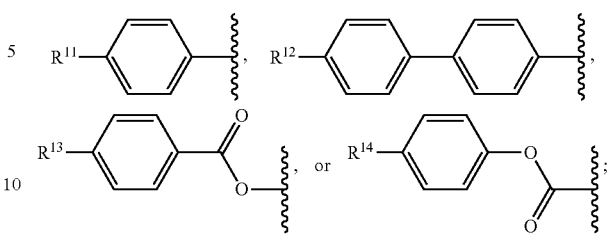

wherein $R^{11}$, $R^{12}$, $R^{13}$ and $R^{14}$ are independently alkyl or alkoxy.

13. The composition of claim 12, wherein $R^{11}$, $R^{12}$, $R^{13}$ and $R^{14}$ are independently $C_{3-9}$ alkyl or $C_{3-9}$ alkoxy.

14. The composition of claim 11, wherein $Y^1$ is $C_{1-8}$ alkyl.

15. The composition of claim 11, wherein $Y^1$ is —CN.

16. The composition of claim 11, wherein the additional compound is:

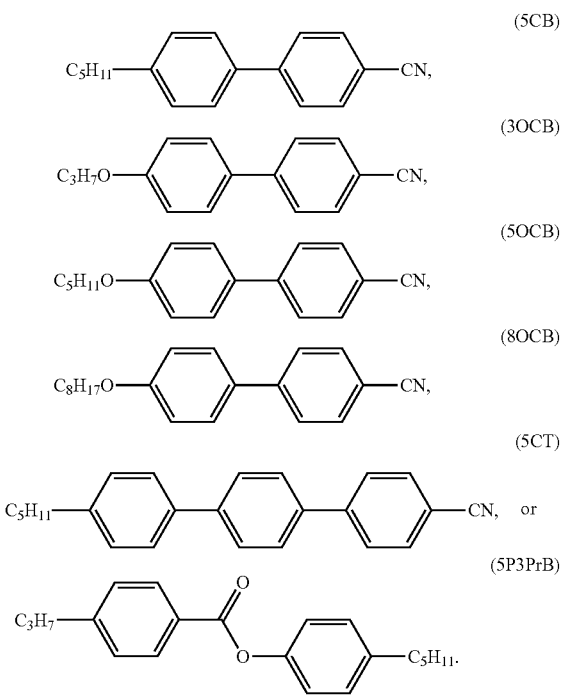

17. A liquid crystal element comprising:
a transparency changing layer; and
at least two alignment layers bounding each side of the transparency changing layer;
wherein the transparency changing layer comprises the composition of claim 11.

18. A selectively dimmable device comprising:
A liquid crystal element of claim 17;
at least two conductive substrates: a first conductive substrate and a second conductive substrate; and
a voltage source;
wherein the first conductive substrate and the second conductive substrate define a gap between them, and the liquid crystal element is disposed between the first conductive substrate and the second conductive substrate within the gap; and wherein the substrates and the liquid crystal element are in electrical communication with the voltage source, and an electric field is generated across the liquid crystal element when a voltage is applied from the voltage source.

19. The device of claim 18, having a haze of at most 5% when no voltage is applied.

20. The device of claim 18, having a haze of at least 40% when a voltage of at least 25 volts is applied across the device.

21. The device of claim 18, having a haze of at most 5% when no voltage is applied, and a haze of at least 40% when a voltage of at least 25 volts is applied across the device.

22. The device of claim 18, wherein the conductive substrates are flexible.

23. The device of claim 22, which is a flexible sheet.

* * * * *

UNITED STATES PATENT AND TRADEMARK OFFICE
CERTIFICATE OF CORRECTION

PATENT NO. : 11,001,757 B2  
APPLICATION NO. : 16/636603  
DATED : May 11, 2021  
INVENTOR(S) : Khan et al.

Page 1 of 1

It is certified that error appears in the above-identified patent and that said Letters Patent is hereby corrected as shown below:

In the Claims

Column 37, Line 55: Claim 2 replace "$R^1$, $R^2$, $R^3$, $R^4$, $R^5$, $R^6$, $R^2$, and $R^8$" with -- $R^1$, $R^2$, $R^3$, $R^4$, $R^5$, $R^6$, $R^7$, and $R^8$ --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*